United States Patent [19]

Kasao

[11] Patent Number: 5,875,265

[45] Date of Patent: Feb. 23, 1999

[54] IMAGE ANALYZING AND EDITING APPARATUS USING PSYCHOLOGICAL IMAGE EFFECTS

[75] Inventor: Atsushi Kasao, Nakai-machi, Japan

[73] Assignee: Fuji Xerox Co., Ltd., Tokyo, Japan

[21] Appl. No.: 665,692

[22] Filed: Jun. 18, 1996

[30] Foreign Application Priority Data

Jun. 30, 1995 [JP] Japan ................... 7-165454

[51] Int. Cl.$^6$ .................. G06K 9/00; G06F 17/20
[52] U.S. Cl. ................. 382/229; 434/236; 707/517
[58] Field of Search .................. 382/112, 173, 382/229; 707/517; 434/236; 395/919, 921, 934; 706/919, 921, 934

[56] References Cited

U.S. PATENT DOCUMENTS

| | | | |
|---|---|---|---|
| 4,396,903 | 8/1983 | Habicht et al. | 382/9 |
| 5,142,592 | 8/1992 | Moler | 382/22 |
| 5,243,517 | 9/1993 | Schmidt et al. | 364/419.2 |
| 5,424,945 | 6/1995 | Bell | 364/419.2 |
| 5,550,746 | 8/1996 | Jacobs | 364/479.01 |
| 5,566,289 | 10/1996 | Ikeo et al. | 395/148 |

FOREIGN PATENT DOCUMENTS

| | | | |
|---|---|---|---|
| 52-80043 | 7/1977 | Japan | G02B 27/02 |
| 5-225266 | 9/1993 | Japan | G06F 15/60 |
| 6-83924 | 3/1994 | Japan | G06F 15/62 |

OTHER PUBLICATIONS

"A Primer Visual Literacy", by D.A. Dondis, MIT Press, 1973 (Katachi wa kataru in Japanese, translated by Takayoshi Kaneko, Science–sha), pp. 86–95.

"Arts and Vision" by Arnheim (Bijutsu to Shikaku in Japanese translated by Kanji Hatano and Yorio Seki, Bijutsu–Shuppansah), 1954, pp. 424–435.

Shoko Ashizawa et al., "Size Effect in Color Conspicuity"; Journal of the Color Science Association of Japan; vol. 18, No. 3, 1994 (pp. 200–204).

Primary Examiner—Andrew W. Johns
Attorney, Agent, or Firm—Oliff & Berridge, PLC

[57] ABSTRACT

An image analyzing and expression adding apparatus for presenting an operator with image impressions displayed in terms of sensitive language and for allowing the operator to use stored design know-how in adding expressions to the image on display. An image segmenting unit segments an input image into a plurality of areas. An image feature storing unit stores the physical feature quantities of each of the segmented areas. The physical feature quantities are processed by an image analyzing unit preparing visual feature quantities about the entire image. A sensitive influence quantity computing unit receives the visual feature quantities thus prepared and, based on information from a design know-how storing unit, computes factors of the terms representing sensitivity. The operator is presented with the factors of the sensitivity-expressing terms. In response, the operator instructs desired expressions using the sensitivity-expressing terms through an expression instructing unit. An image expression adding unit receives the instructions about the expressions and modifies the image by referring to the information from the design know-how storing unit. The physical feature quantities of the segmented areas are also modified immediately, so that the impressions of the modified image are analyzed and displayed.

15 Claims, 33 Drawing Sheets

VISUAL LANGUAGE AXES CONSTITUTING VISUAL LANGUAGE
SPACE (WHERE IMAGE IS NOT STRUCTURED)

VISUAL LANGUAGE AXES CONSTITUTING VISUAL LANGUAGE
SPACE (WHERE IMAGE IS NOT STRUCTURED)

| VISUAL FEATURE QUANTITIES ||
|---|---|
| QUANTITIES FOR DESCRIBING THE ENTIRE IMAGE | QUANTITIES FOR DESCRIBING RELATING BETWEEN PARTIAL OBJECTS |

VISUAL LANGUAGE = VISUAL LANGUAGE (VISUAL FEATURE QUANTITY 1, VISUAL FEATURE QUANTITY 2, ...)

FIG.12

Visual Feature Quantities Computed for the Entire Image

<Stable-unstable>
Mean value of unit heaviness
Mean value of unit lightness
Center of heaviness
Center of lightness
Vector from center of heaviness to
 center of lightness <Concentrated-dispersed>
Degree of dispersion of unit
 heaviness
Degree of dispersion of unit
 lightness
Center of heaviness
Center of lightness
Degree of dispersion of unit
 warmness
Degree of dispersion of unit
 coolness
Center of warmness
Center of coolness <Static-dynamic>
Asymmetry
Complexity of border lines
 Direction of texture
 Strength of texture <Warm-cool>
 Type of texture
 Strength of texture
Mean value of unit warmness
Dispersion of unit warmness
Mean value of unit coolness
Dispersion of unit coolness
Center of warmness
Center of coolness
Vector from center of warmness to
 center of coolness
<Vivid-quiet>
Mean value of chroma
Dispersion of chroma <Bright-dark>
Mean value of brightness
Dispersion of brightness <Rhythmical-melodious>
Frequency of rhythm of cool and
 warm colors
Direction of rhythm of cool and
 warm colors
Strength of rhythm of cool and
 warm colors
Frequency of rhythm of brightness
 and darkness
Direction of rhythm of brightness
 and darkness
Strength of rhythm of brightness
 and darkness Direction of rhythm of texture
 Strength of rhythm of texture <Deep-flat>
Number of vanishing points
Layout of vanishing points
Strength of perspective
Strength of vanishing points <Straight-curved>
Mean linearity of border lines
 Type of texture
 Strength of texture

FIG. 13

Visual Feature Quantities Computed for Image Parts

Contrasting Effects

Contrast in color between objects
Contrast in color against background
Contrast in brightness between objects
Contrast in brightness against background
Contrast between objects in terms of position of center of gravity
Contrast against background in terms of position of center of gravity
Contrast in heaviness between objects
Contrast in heaviness against background
Contrast in color dispersion against background
Contrast between objects in terms of complexity of border lines
Contrast between objects in terms of curvature of border lines
Contrast in size between objects
Contrast in size against background
Contrast in layout between objects
Contrast in layout against background
Contrast in moment between objects
Contrast in moment against background
Contrast between objects in terms of frequency of rhythm of brightness and darkness
Contrast against background in terms of frequency of rhythm of brightness and darkness
Contrast between objects in terms of direction of rhythm of brightness and darkness
Contrast against background in terms of direction of rhythm of brightness and darkness
Contrast between objects in terms of strength of rhythm of brightness and darkness
Contrast against background in terms of strength of rhythm of brightness and darkness
Contrast between objects in terms of frequency of rhythm of colors
Contrast against background in terms of frequency of rhythm of colors
Contrast between objects in terms of direction of rhythm of colors
Contrast against background in terms of direction of rhythm of colors
Contrast between objects in terms of strength of rhythm of colors
Contrast against background in terms of strength of rhythm of colors
Contrast between objects in color dispersion

Uncontrasting Effects

Amount of gravity center displacement from object center
Direction of gravity center displacement from object center
Magnitude of moment of object
Direction of moment of object

FIG. 14

IMAGE FEATURE TABLES AND INDICIES

DISPLAY OF IMAGE COORDINATES

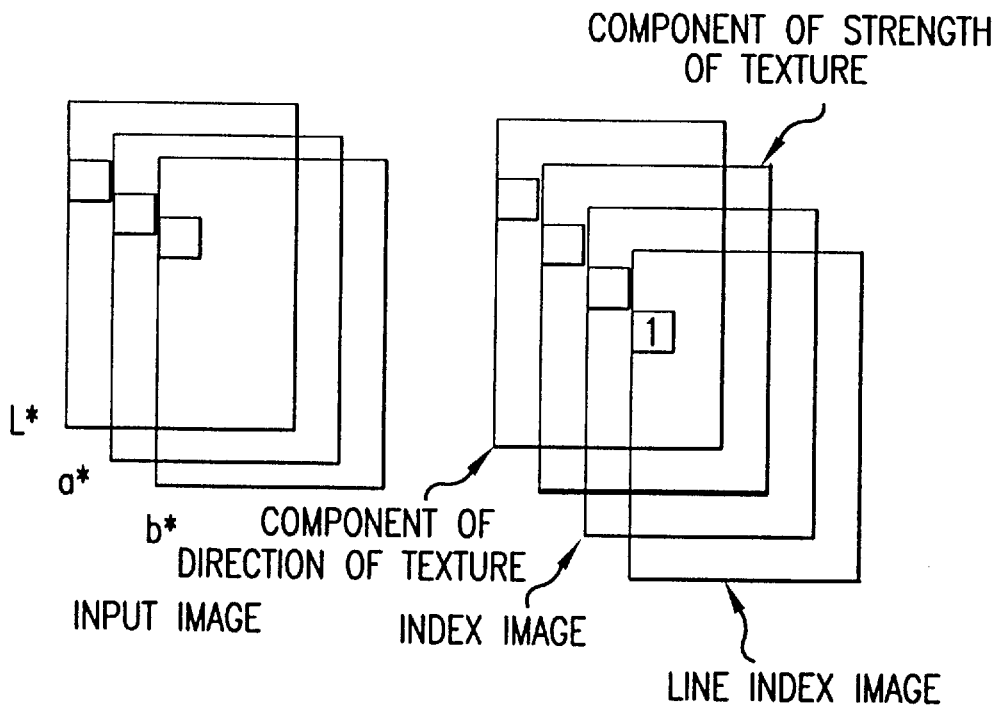
FIG. 26
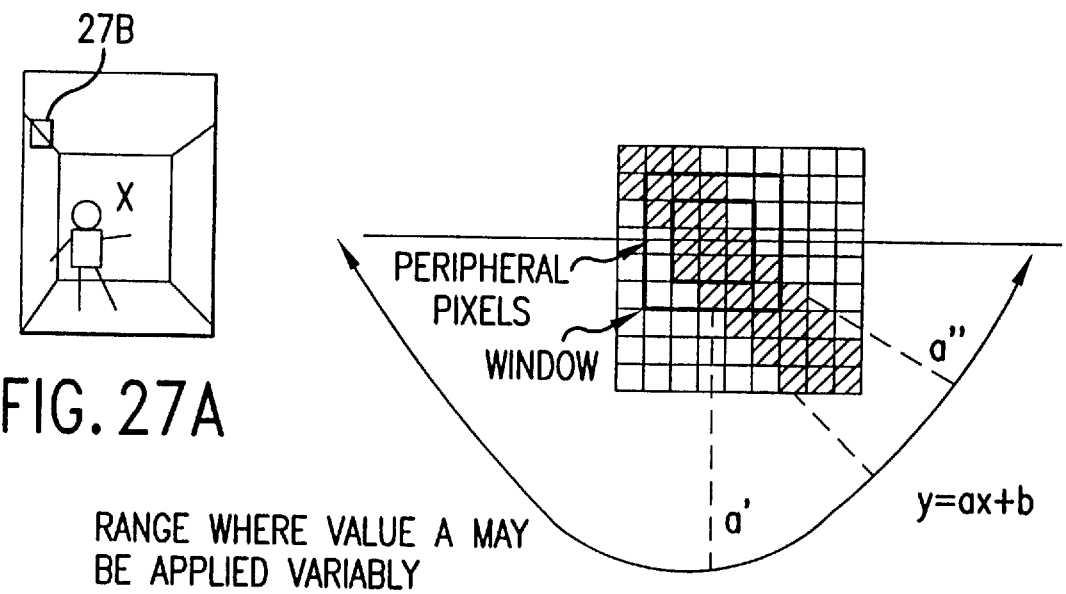
FIG. 27A
FIG. 27B

AREA1->MEAN BRIGHTNESS V1, MEAN CHROMA C1,
    MEAN HUE H1, CENTER OF GRAVITY (X1, Y1),
    NUMBER OF PIXELS N1, DIRECTION OF TEXTURE
    TEd1, NUMBER OF PIXELS HAVING TEXTURE
    TEn1, NUMBERS OF BORDER LINES INCLUDED IN
    THE AREA L, L2, ..., TOTAL NUMBER OF BORDER
    LINES INCLUDED IN THE AREA Ln1

AREA2->MEAN BRIGHTNESS V2, MEAN CHROMA C2,
    MEAN HUE H2, CENTER OF GRAVITY (X2, Y2),
    NUMBER OF PIXELS N2, DIRECTION OF TEXTURE
    TEd2, NUMBER OF PIXELS HAVING TEXTURE
    TEn2, NUMBERS OF BORDER LINES INCLUDED IN
    THE AREA L7, L9, ..., TOTAL NUMBER OF BORDER
    LINES INCLUDED IN THE AREA Ln2

STRAIGHT LINE 1-> lX1,ly1, a1 b1, ln1
STRAIGHT LINE 2-> lX2, ly2, a2, b2, ln2
VANISHING POINT 1->(x1, y1), •1, •1, •2, •2, •3, •3

IMAGE FEATURE TABLE FOR DESCRIBING
STRAIGHT LINES AND VANISHING POINTS

FIG.28

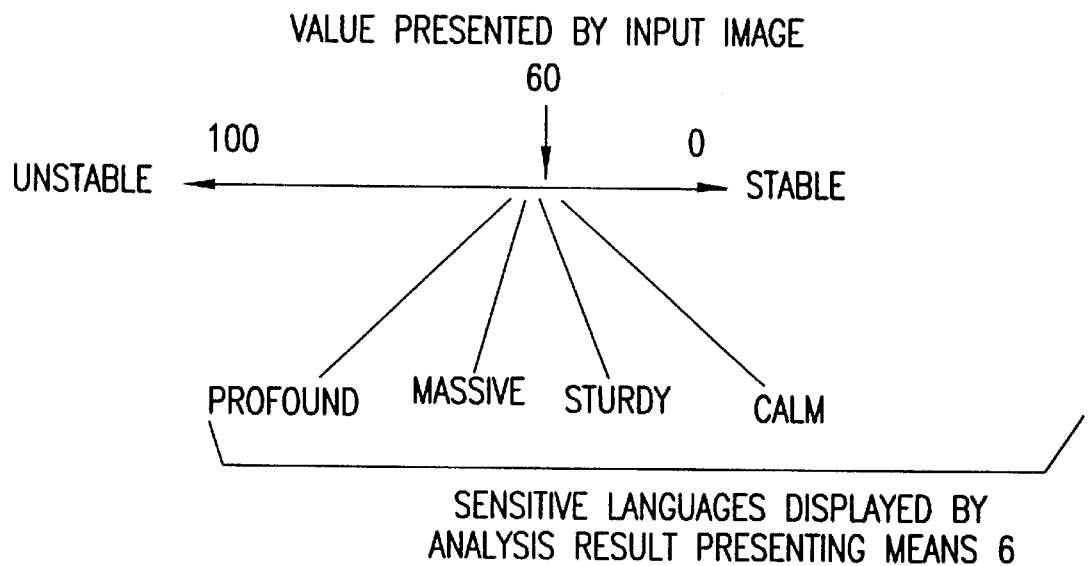

SENSITIVE LANGUAGES DISPLAYED BY
ANALYSIS RESULT PRESENTING MEANS 6

FIG.29

|  |  |  |  |
|---|---|---|---|
| "GENTLE" | | 2 | DISCREPANCY |
| 1. VIVIDNESS/WARMNESS | (40,80) | | 40 |
| 2. BRIGHTNESS | 30 | | 40 |
| 3. CONCENTRATION | 50 | | 20 |
| | | | |
| "SPORTY" | | 1 | |
| 1. MOTION/RYTHMICAL | (80,20) | | 50 |
| 2. UNSTABLENESS | 70 | | 10 |
| 3. VIVIDNESS/WARMNESS | (80,30) | | 30 |
| | | | |
| "STURDY" | | 1 | |
| 1. UNSTABLENESS | 20 | | 60 |
| 2. LINEARITY | 80 | | 30 |
| 3. VIVIDNESS/WARMNESS | (20,20) | | 30 |

DESIGN KNOW-HOW/PLAN PRESENTING UNIT

FIG.31

Input Image

Structured Input Image

Structure 1: areas 5, 6, 10, 11, . . .
Structure 2: areas 1, 2, 3, 4, 7, . . .

Image with its Stableness Enhanced

"GENTLE"              2      DISCREPANCY
1. VIVIDNESS/WARMNESS (60,70)    40
2. BRIGHTNESS          60       10
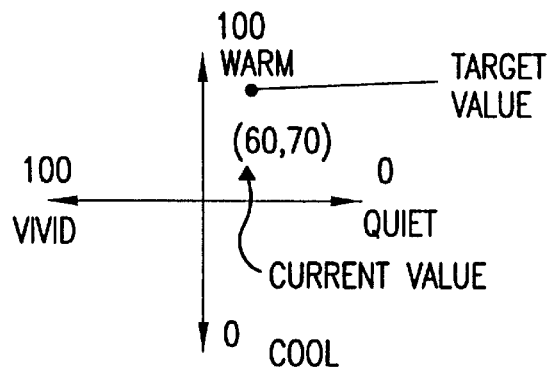
"SPORTY"              1      DISCREPANCY
1. MOTION/RYTHMICAL  (60,60)    30
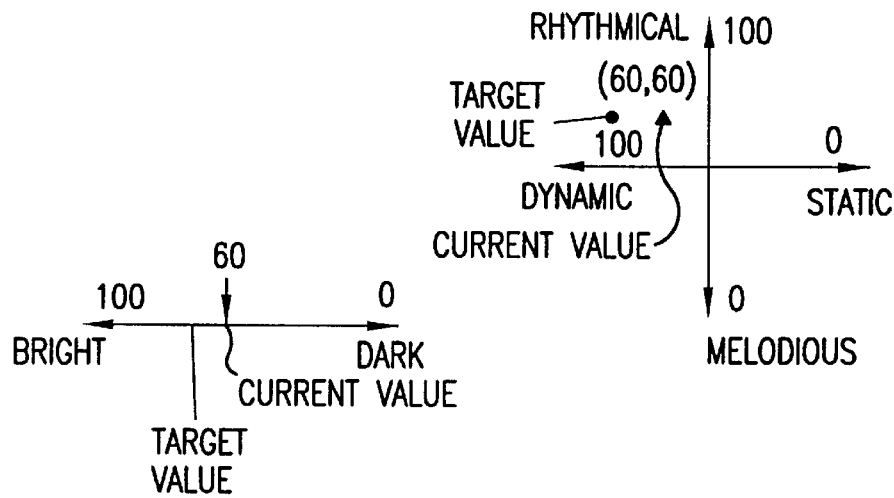
"STURDY"              1      DISCREPANCY
1. UNSTABLENESS       30       10
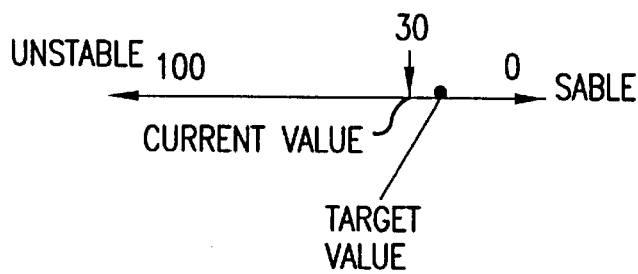
FIG.42

Direction of Texture

Motion-Supplemented Image

"SPORTY              1           DISCREPANCY
1. MOTION/RYTHMICAL  (85,60)          5

"GENTLE"                2         DISCREPANCY
1. VIVIDNESS/WARMNESS  (60,70)         40
2. BRIGHTNESS           60             10

IMAGE ANALYZING AND EDITING APPARATUS USING PSYCHOLOGICAL IMAGE EFFECTS

BACKGROUND OF THE INVENTION

1. Field of the Invention

The present invention relates generally to image processing techniques and, more particularly, to an image analyzing and expression adding apparatus for analyzing images such as quantified full-color pictures so that an operator may determine a suitable design plan according to the result of such analysis, the apparatus further allowing displayed images to be supplemented by necessary expressions in keeping with the design plan thus obtained.

2. Description of the Related Art

Today, desk-top publishing (abbreviated to DTP hereunder) is gaining widespread use and finding its way into small offices and households. Processing of images for use in DTP is becoming easier than before thanks to the development of image editing devices and image retouch systems. However, DTP has posed two major obstacles for ordinary users (i.e., nonspecialists) when it comes to adding suitable expressions to images such as photographs in a manner consistent with the purposes of the target document being prepared.

The first obstacle is that so-called suitable expressions to be added to an image are something that is difficult for people to understand in the first place. The second obstacle is the lack of a method for efficiently transmitting to the image processing system in use those locations within the image to which to add the desired expressions.

The second obstacle applies not only to ordinary users but also to specialists such as photo retouchers. There exist some conventional methods for designating necessary areas in images. One such method involves enclosing designated pixels with appropriate circles or rectangles. Another traditional method involves regarding contiguous pixels of similar colors as the same area and expanding that area collectively. One disadvantage of these methods is the difficulty in effectively designating areas in keeping with a given pattern. Yet another conventional method proposes applying area dividing techniques such as the k-means algorithm to designating image areas. This method is not very practical because the speed of processing drops considerably the larger the image. However, the second obstacle is being overcome by the recent development of algorithms of image segmentation such as the division k-means algorithm designed to divide large images into areas in a short time.

To return to the first obstacle, the so-called suitable expression to be added to the image merits scrutiny. In DTP, images are often pasted onto the target document. Suitable images are images that conform to the purposes of the document in question and assist in achieving such purposes effectively. For example, suppose that a bicycle retailer plans to stock a large number of mountain bicycles which are sturdy, designed to run at high speed, and operable by nonmuscular female users; that in a bid to sell the bicycles, the retailer develops a sales campaign and promotes it using leaflets targeted to the retailer's region; and that each of the leaflets has full-color photographs of the mountain bicycle being marketed. In this hypothetical case, the image of the leaflet as a whole needs to be determined, and the messages to be conveyed by the photographs are to be appropriately designed as well. To begin with, sensitive language (i.e., a term or a set of terms for expressing aspects of sensitivity or impressions) is used to express what is desired to be conveyed to potential customers. The terms of sensitive language to be used in the sales campaign are assumed to be selected from among those most commonly used, such as the terms listed in FIG. 3, "Color Image Scale" of Japanese Patent Laid-Open No. Sho 52-80043 (1977). (In this laid-open publication, images and impressions expressed in colors are represented by terms of sensitive language called color image terms.) Since the sales campaign is targeted to female users, the retailer wants the leaflet to convey the "gentleness" of the product for use by female customers, the "sportiness" of the product because the bicycle is designed to run at high speed, and the "safety" of the product because the bicycle while running is most unlikely to overturn. With the sales campaign targeted exclusively to female prospects, the retailer decides to put high priority to the term "gentleness" and medium priority to "sportiness" and "safety."

Suppose next that the leaflet is to be designed by a DTP system. First to be prepared are the layout of the leaflet and the photographs of the marketed product in compliance with the overall design plan. This is where some questions arise with respect to the photographs actually taken of the product and prepared for the campaign: Are the photographs fully representative of the "gentleness," "sportiness" and "safety" of the product in appropriate proportions? Are the images indicative of the retailer's originality and appealing to those who see them? Should the images be judged inadequate, where do they need to be retouched, and in what manner? These are the questions which stem from image analysis and which concern additional expressions based on such analysis.

To those who use the DTP system, answering the above questions requires specialized knowledge about design in general. It is almost impossible for them to answer these questions directly by simply referring to physical features of the image in question. This is a major barrier that hampers efforts to render the designing process automatic or semi-automatic.

How far the research on image analysis has advanced and what can be done based on what has been found so far will now be outlined in three aspects: symbolic, concrete and abstract. The symbolic aspect of image analysis involves examining images in terms of characters and symbols. The concrete aspect of image analysis involves interpreting images as concrete objects such as human beings and automobiles, while the abstract aspect involves analyzing images in terms of color surface areas and compositions as in abstract paintings. Japanese Patent Laid-Open No. Hei 5-225266 (1993) proposes a design apparatus for supporting design activities in their concrete aspect. However, as the preferred embodiment of the laid-open patent is shown to address only automotive parts, systems of the disclosed kind need to have their targets limited to certain fields. Otherwise the computers of such systems are incapable of processing huge quantities of image knowledge involved. At present, it is apparently difficult to implement general-purpose design apparatuses working on the concrete aspect of image analysis. Meanwhile, research on the abstract aspect of image analysis is making a significant progress promoted by a number of researchers. The abstract aspect of image analysis is particularly important for photographic images because their symbolic aspect was already determined when they were taken.

How the abstract aspect of images is analyzed is discussed illustratively by D. A. Dondis in "A primer of visual literacy", MIT Press, 1973, ("Katachi wa kataru" in Japanese, translated by Takayoshi Kaneko, Science-sha), and by Arnheim in "Arts and Vision" ("Bijutsu to shikaku"

in Japanese, translated by Kanji Hatano and Yorio Seki, Bijutsu-Shuppansha). With respect to the synesthetic effects of colors, attempts have been made to grasp quantitatively the relations between the brightness of colors and their perceived heaviness as well as the relations between chromaticity and warmness (e.g., by Hideaki Chijiwa in "Chromatics" from Fukumura-Shuppan). In addition, the effects of colors are known to differ depending on the area occupied by each color, as described by Masako Ashizawa and Mitsuo Ikeda in "Area Effects of Chromatic Prominence" ("Iro no Medachi no Menseki-Koka" in Japanese, the periodical of the Japan Society of Chromatics, Vol. 18, No. 3, 1994). The chromatic effects of an image can be predicted to a certain extent with the colors and their areas in the image taken as parameters. The color image scale disclosed in the above-cited Japanese Patent Laid-Open No. Sho 52-80043 is an application of the synesthetic effects of colors to image analysis. The disclosed color image scale is prepared by polling a large number of people on the impressions they receive from colors (i.e., color images) and by laying out the results of the poll in a space composed of three axes: warm/cool, hard/soft, and clear/grayish. The color image scale is applied extensively not only to colors but also to other image elements in diverse fields of design activities. However, since this scale was originally provided to address colors alone, inconveniences have often been experienced. For example, while colors give impressions of warmness or coolness mainly on the basis of their chromaticity, textures like furs tend to give warm impressions and those of metal surfaces are likely to give cool impressions. It follows illustratively that the texture of a blue fur and that of a red metal surface are both located close to the origin of the color image scale. That is, images are more likely to be located near the origin of the scale the more complex their component elements become. This negates the initial purpose of the color image scale, i.e., that of classifying images. Although the texture of, say, a red metal surface has a specific significance, its image is mapped near the origin of the scale and is thus expressed as something featureless and bland. To circumvent this problem, the laid-open patent proposes examining more detailed image terms in advance and mapping these terms in the color-based coordinates, whereby the expressions of diverse images are made possible in a simple, three-dimensional space. This technique promises an improvement in image differentiation but tends to highlight awkward aspects of the mapping of a design composed of numerous elements on the basis of the proposed image terms. The reason for such awkwardness is that distances in the image space are originally based on colors. That is, a long distance in the image space does not necessarily mean a large difference between images.

Another solution to the above problems in the abstract aspect of image analysis is a method of having a computer compute numerous physical and psychophysical quantities of target image colors. The results of the computations are arranged into axes constituting a space in which to map terms of sensitive language through "fuzzy" processing. Such a method is supposed to analyze a large number of image expressions. The method is expected to be effective when used on designs with simple visual effects but will not be suitable for analyzing complicated visual effects. The major reason for this is the difficulty experienced in furnishing design knowledge to the image analyzing system in use. The system is required to ensure direct correspondence between numerous physical and psychophysical quantities on the one hand, and the types of sensitivity (i.e., elements of sensitive language) given as impressions on the other hand. It is an enormously time-consuming task for the designer not familiar with physical or psychophysical quantities to prepare design knowledge in a way usable by the system. If the correspondence between a large number of physical and psychophysical quantities and the image types (elements of sensitive language) is acquired through statistical processing in order to eliminate the designer's chore, individual design techniques tend to cancel out one another the more complicated the composition of the elements in the design in question. That is, it is difficult to determine which of the techniques in the design is of utmost significance. In the example above of the bicycle retailer's sales campaign, two of the three key concepts, "sportiness" and "safety," are located at two extreme ends of one axis on the color image scale of FIG. 3 in Japanese Patent Laid-Open No. Sho 52-80043 (the scale is one of a number of known image scales proposed at present). There is no way that these two concepts are both satisfied on the proposed scale. An attempt forcibly to satisfy the two concepts simultaneously will simply map their images close to the origin of the scale.

Furthermore, a good designer should first of all have a firm grasp of general design techniques and of the effects that such techniques can exert to viewers. Secondly, the designer should be able to fully project his or her originality in the works rendered. This means that a competent system should also have a solid grasp of general design techniques and of the effects that such techniques can exert to viewers. In addition, the system should be capable of providing its works with its own distinctiveness (i.e., designer's originality). Only such a system can adequately address the tasks of image analysis and processing. As described above, conventional image analyzing systems merely compute the images that viewers directly receive from physical and psychophysical quantities and are incapable of sufficient image analysis. A system for analyzing complicated image expressions needs a knowledge database structure ready to accommodate designers' knowledge and expertise. This kind of knowledge database requires arrangements for incorporating general design techniques, designers' originalities as well as the differences in image perception between viewers of, say, different age groups and ethnic origins.

Another disadvantage of existing image analyzing systems is their limited ability merely to indicate in percentage points how much of the purpose of the image in question will have been achieved overall. (In the example of the bicycle retailer's sales campaign, the purposes of the images are expressed in priorities 2, 1 and 1 put respectively to the concepts "gentleness," "sportiness" and "safety." The larger the number, the higher the priority.) Although the percentage thus obtained provides a rule of thumb in the subsequent steps of image retouch and expression supplementation, the result of the analysis cannot be used directly in retouching images or in adding suitable expressions to images.

As outlined above, there has yet to be an image analyzing system capable of checking to see if the concepts of, say, the "gentleness," "sportiness" and "safety" in the above-cited hypothetical bicycle retailer's sales campaign are suitably expressed using priorities 2, 1 and 1 respectively, and to see if the target document has its originality.

Techniques for adding expressions to images will now be outlined. An ideal technique would be one allowing the result of the image analysis to be utilized directly in retouching images or in supplementing images with additional expressions. Since such a technique does not exist, the description that follows will focus on techniques for adding expressions to images.

Adobe Systems Incorporated is marketing the software product called PhotoShop (TM) that permits photo retouch with DTP systems. The same company also offers the software product called PageMaker (TM) offering edit features. These products are inexpensive and may readily be purchased by individuals. As discussed earlier, for those who never experienced retouching photographs, it is no easy task to define those areas in the image to which to add expressions. This function has yet to be implemented by Photo-Shop. Japanese Patent Laid-Open No. Hei 6-83924 (1994) proposes an image editing apparatus aimed at bringing about that function. The proposed apparatus divides a given image into segments that are labeled each, and allows the user to operate a pointing device to select collectively the pixels included in a given segment. Because the apparatus selects one of three factors, i.e., hue, chroma or value as image information used for segmentation, it suffers from the disadvantage of having long distances in an image grouped into a single segment each. Another disadvantage of the apparatus is that natural images used in printing tend to be large in size and thus take considerable time to segment.

Another method that has been practiced to convey additional expressions to the image editing system is one which allows a pen-like tool to be manipulated through the use of a pointing device in the same manner that a painter draws a painting. Another practiced method involves applying special effects to part or all of the image in question and/or carrying out color conversion on the image. There has also been proposed a similar method for performing color conversion by inputting not the values representing colors but the terms of sensitive language (image terms) mapped on the color image scale introduced earlier. Another proposed method involves classifying images in sensitive language and searching therethrough. In any case, it is not preferable to map on the color image scale the images containing complex information other than colors for the reasons discussed above.

A more serious problem is the absence of a system capable of carrying out the whole series of processing from image analysis to the addition of expressions to images in achieving the purposes of the target document using such images.

The major technical challenges discussed so far are summarized as follows:

(1) There exist no image analyzing and expressing systems capable of utilizing the result of image analysis in the process of adding expressions to the target image.
(2) Operators having no design knowledge are unable to add suitable expressions to images.
(3) Conventional image analyzing systems based on the existing image scales are incapable of fully analyzing an image that is expressed in those terms of sensitive language which have contradictory meanings.
(4) Conventional expression adding systems based on the existing image scales, when using a pair of sensitive language terms having contradictory meanings, are incapable of adding the applicable expressions simultaneously to an image.
(5) Designers' originalities cannot be expressed by conventional systems.
(6) It is not easy for systems to acquire knowledge specific to individual designers.
(7) Systems can only obtain simplified design knowledge.
(8) There has yet to be an effective way of handling images.

SUMMARY OF THE INVENTION

It is therefore an object of the present invention to overcome the above and other deficiencies and disadvantages of the prior art and to provide an image analyzing and expression adding apparatus capable of performing the entire series of processing from image analysis to the addition of expressions to images in a seamless manner.

In carrying out the invention and according to a first aspect thereof, there is provided an image analyzing and expression adding apparatus (to be described later with reference to FIG. 1) comprising: image inputting means for inputting an electronic image; image segmenting means for segmenting the image input through the image inputting means into a plurality of areas; area feature storing means for storing physical feature quantities about each of the plurality of areas; image analyzing means for computing visual feature quantities of the input image on the basis of the physical feature quantities; design know-how storing means for storing the design know-how regarding the correspondence between the visual feature quantities of the input image on the one hand, and sensitive language in which to express impressions of the input image on the other hand; sensitive influence quantity computing means for computing, on the basis of the information stored in the design know-how storing means, those factors of the sensitive language which correspond to the visual feature quantities of the input image; analysis result displaying means for displaying in the sensitive language the impression perceived by viewers from the input image; expression instructing means for instructing expressions to be added to the input image by use of the sensitive language; image expression adding means for modifying the input image on the basis of the instructed expressions and the information stored in the design know-how storing means; and expressed image displaying means for displaying the modified image. Because the result of image analysis is displayed by use of the sensitive language that expresses image impressions and because desired expressions are input using a similar sensitive language, the input image may be readily modified in accordance with the user's purposes.

In a first variation of the above embodiment (to be described with reference to FIG. 2) according to the first aspect of the invention, the image segmenting means comprises: texture extracting means for extracting a texture from the input image; area segmenting means for performing area segmentation based on the extracted texture and the input image; line extracting means for extracting major segments from the result of the area segmentation; and vanishing point extracting means for extracting vanishing points based on the extracted major segments. This preferred structure of the invention allows the image areas to be further segmented in accordance with the extracted texture.

In a second variation of the above embodiment (to be described later with reference to FIG. 3), the design know-how storing means comprises: feature quantity-to-visual language correspondence storing means for storing the correspondence between the visual feature quantities of the input image and a visual language for expressing visual features constituting a relatively universal scale; and visual language-to-sensitive language correspondence storing means for storing the correspondence between the visual language and the sensitive language which is influenced significantly by age groups and ethnic origins of viewers. In addition, the sensitive influence quantity computing means comprises: visual language computing means for computing, on the basis of the information stored in the feature quantity-to-visual language correspondence storing means, those factors of the visual language which correspond to the visual feature quantities of the input image; and sensitive language computing means for computing, on the basis of the information stored in the visual language-to-sensitive language correspondence storing means, those factors of the sensitive language which correspond to those factors of the visual language which are determined by the visual language computing means. This preferred structure of the invention facilitates the supply of designers' know-how and expertise to the image analyzing system, and makes it possible to classify the supplied know-how into two categories: design know-how that is highly common to target viewers, and design know-how less common to them.

In a third variation of the above embodiment (to be described later with reference to FIG. 4), the visual language-to-sensitive language correspondence storing means includes: visual language-to-sensitive language correspondence set storing means for storing a plurality of sensitive language-to-visual language correspondences; and correspondence selecting means for selecting any of the plurality of sensitive language-to-visual language correspondences. Because the visual language-to-sensitive language correspondence storing means handles design know-how that tends to be less common to target viewers, that design know-how is required to be modified according to the target viewers' ethnic origin and age group. Meeting that requirement is made easier by providing beforehand a plurality of sensitive language-to-visual language correspondences for a plurality of groups of representative viewers. The operator may select one of such correspondences with respect to the target viewer group.

In a fourth variation of the above embodiment (to be described later with reference to FIG. 5), the image analyzing and expression adding apparatus further comprises: individual design know-how package storing means for storing a plurality of correspondences between the feature quantities and the visual language in accordance with a plurality of packages of know-how in a given design; know-how selecting means for selecting any of the plurality of packages of know-how; and feature quantity-to-visual language correspondence changing means for changing the information stored in the feature quantity-to-visual language correspondence storing means by use of the plurality of feature quantity-to-visual language correspondences stored in the design know-how package storing means. The input image is modified through the use of the feature quantity-to-visual language correspondence applicable to the selected package of know-how. Because multiple feature quantities correspond to a single visual language in the feature quantity-to-visual language correspondence storing means within the design know-how storing means, the visual language is uniquely determined from a given feature quantity during image analysis. Where an expression is to be added, however, feature quantities cannot be uniquely obtained from the visual language. Thus in the second and the third variations of the above embodiment, combinations of feature quantities considered to be generic are determined in advance. In the fourth variation of the above embodiment, the fact that multiple feature quantities correspond to a single visual language is taken advantage of in expressing various designers' originalities. In doing this, the third variation of the above embodiment is supplemented so as to vary the plurality of feature quantity-to-visual language correspondences as needed.

As shown in FIG. 6, the fourth variation of the embodiment above may include visual language determining means for determining the visual language on the basis of three factors: design plan preparing know-how stored in the individual design know-how package storing means, a plurality of sensitive languages input from the expression instructing means, and sensitive language-to-visual language axis correspondences stored in the visual language-to-sensitive language correspondence set storing means.

In addition, as depicted in FIG. 7, the third variation of the above embodiment may include detailed expression instructing means replacing the expression instructing means. The detailed expression instructing means permits instruction of expressions by use of directly visual feature quantities.

In a fifth variation of the above embodiment (to be described later with reference to FIG. 8), the image analyzing and expression adding apparatus further comprises: segmented image displaying means for displaying the input image segmented by the image segmenting means; structure map preparing means for preparing a structure map expressing in a map the structural relation between parent areas and child areas, the parent areas representing major structures instructed by an operator in the segmented input image, the child areas being those areas encompassed in the parent areas; and structure map storing means for storing the structure map. The visual feature quantities of the input image are computed from the physical feature quantities of the segmented areas in the input image with reference to the structural relation. In this preferred structure of the invention, the image is modified in units of structures. As the image is modified, the visual feature quantities involved are modified correspondingly in units of structures and the image is reanalyzed rapidly.

The fifth variation of the above embodiment may further include, as shown in FIG. 9, area integrating means for integrating the image areas segmented by the image segmenting means using color differences as a parameter; segmented image displaying means for displaying the image areas thus integrated; structural relation correcting means for allowing the operator to correct the structure map while viewing the integrated image areas; and structure map storing means for storing the structure map thus corrected.

In the second variation of the embodiment outlined above, the factors of the visual language handled by the visual language computing means are each composed of at least one visual feature quantity element. Each factor is expressed as a point on a number axis whose both ends are defined by two mutually contradictory words. There are provided different number axes that are highly independent of one another in terms of significance. Pairs of such contradictory words include: (stable, unstable), (dynamic, static), (warm, cold), (bright, dark), (vivid, quiet), (deep, flat), (straight, curved), (distinct, flat), (rhythmical, melodious), and other pairs of words whose significance may be graded by degrees of difference.

The feature quantities to be computed by the image analyzing means of the fifth variation of the above embodiment may be computed by computer directly from either an image feature table in the area feature storing means or a structure map in the structure map storing means, or from both. That is, the feature quantities may be constituted either by what defines the image as a whole or by what defines mutual relations between partial objects in the image, or by both.

The feature quantities expressing overall effects may each be composed of at least one of the following elements: mean value of brightness, dispersion of brightness, mean value of chromaticity, dispersion of chromaticity, moment of heaviness, center of heaviness (gravity), moment of lightness, center of lightness, positional relation between center of heaviness and center of lightness, number of vanishing points, layout of vanishing points, depth of vanishing points, strength of vanishing points, center of gravity of warm colors, center of gravity of cool colors, positional relation between center of gravity of warm colors and center of gravity of cool colors, position of maximum bright point or line, brightness gradient from maximum bright point or line to minimum bright point or line, direction of brightness gradient from maximum bright point or line to minimum bright point or line, type of texture, strength of texture, direction of texture, complexity of border lines, curvature of border lines, frequency of rhythm of cool and warm colors, direction of rhythm of cool and warm colors, strength of rhythm of cool and warm colors, frequency of rhythm of brightness and darkness, direction of rhythm of brightness and darkness, and strength of rhythm of brightness and darkness.

The feature quantities expressing the effects of partial objects depicted in an image fall into two categories: those expressing contrasting effects, and those of uncontrasting effects. The feature quantities expressing contrasting effects are each composed of at least one of the following elements: contrast in color between objects, contrast in color against background, contrast in brightness between objects, contrast in brightness against background, contrast between objects in terms of position of center of gravity, contrast against background in terms of position of center of gravity, contrast in heaviness between objects, contrast in heaviness against background, contrast in color dispersion against background, contrast between objects in terms of complexity of border lines, contrast between objects in terms of curvature of border lines, contrast in size between objects, contrast in size against background, contrast in layout between objects, contrast in layout against background, contrast in moment between objects, contrast in moment against background, contrast between objects in terms of frequency of rhythm of brightness and darkness, contrast against background in terms of frequency of rhythm of brightness and darkness, contrast between objects in terms of direction of rhythm of brightness and darkness, contrast against background in terms of direction of rhythm of brightness and darkness, contrast between objects in terms of strength of rhythm of brightness and darkness, contrast against background in terms of strength of rhythm of brightness and darkness, contrast between objects in terms of frequency of rhythm of colors, contrast against background in terms of frequency of rhythm of colors, contrast between objects in terms of direction of rhythm of colors, contrast against background in terms of direction of rhythm of colors, contrast between objects in terms of strength of rhythm of colors, contrast against background in terms of strength of rhythm of colors, and contrast between objects in color dispersion. The feature quantities of uncontrasting effects are each made of at least one of such elements as the amount in which the center of gravity is displaced from the center of a given object, the direction of such gravity center displacement from the center of the object, the magnitude of the moment of the object in question, and the direction of the moment of the object.

According to a second aspect of the invention, there is provided an image analyzing and expression adding apparatus comprising: image inputting means for inputting an electronic image; image segmenting means for segmenting the image input through the image inputting means into a plurality of areas; area feature storing means for storing physical feature quantities about each of the plurality of areas; image analyzing means for computing visual feature quantities of the input image on the basis of the physical feature quantities; design know-how storing means for storing the design know-how regarding the correspondence between the visual feature quantities of the input image on the one hand, and sensitive language in which to express impressions of the input image on the other hand; sensitive influence quantity computing means for computing, on the basis of the information stored in the design know-how storing means, those factors of the sensitive language which correspond to the visual feature quantities of the input image; analysis result displaying means for displaying in the sensitive language the impression perceived by viewers from the input image; expression instructing means for instructing expressions to be added to the input image by use of the sensitive language; selecting means for selecting the target area to be modified from among the plurality of areas; image expression adding means for modifying the image of the target area on the basis of the instructed expressions and the information stored in the design know-how storing means; and expressed image displaying means for displaying the modified image. Because it is possible to instruct the target area to be modified, the operator's intentions are readily reflected in the process of adding expressions to the image.

In a first variation of the above embodiment according to the second aspect of the invention, the plurality of areas segmented by the image segmenting means are grouped into at least one parent area. The target area to be modified is selected in units of the parent area. This preferred structure of the invention makes it easy to add the same expression to a desired set of image areas.

According to a third aspect of the invention, there is provided an image analyzing apparatus comprising: image inputting means for inputting an electronic image; and feature quantity computing means for computing, as visual feature quantities of the electronic image, the center position of heaviness in the image input through the image inputting means, the enter position of lightness in the input image, and the vector formed by the center position of heaviness and the center position of lightness. This embodiment of the invention allows the impressions of an image to be analyzed from multiple points of view because it is possible to use as the visual feature quantities the center position of heaviness in the input image, the enter position of lightness in the input image, and the vector formed by the center position of heaviness and the center position of lightness.

In a first variation of the above embodiment according to the third aspect of the invention, the heaviness and lightness of pixels in the input image are determined by the brightness of the pixels. Arrangements are suitably provided so that the higher the level of brightness of the pixels, the lower the level of their heaviness and the higher the level of their lightness.

According to a fourth aspect of the invention, there is provided a design know-how preparing apparatus (to be described later with reference to FIG. 15) comprising: image inputting means for inputting an image for which the visual language in which to express visual features constituting a comparatively universal scale is predetermined; image segmenting means for segmenting the image input through the image inputting means into a plurality of areas; area feature storing means for storing physical feature quantities about each of the plurality of areas; image analyzing means for computing visual feature quantities of the input image on the basis of the physical feature quantities; feature quantity-to-visual language correspondence determining means for determining the correspondence between the visual language predetermined for the input image on the one hand, and the visual feature quantities computed by the image analyzing means on the other hand; visual language computing means for computing factors of the visual language by use of the information representing the correspondence determined between the visual feature quantities and the visual language; and visual language-to-sensitive language correspondence determining means for determining the correspondence between the computed factors of the visual language on the one hand, and the sensitive language input by an operator on the other hand. This embodiment of the invention allows the operator to build up design know-how with little knowledge of physical feature quantities.

These and other objects, features and advantages of the invention will become more apparent upon a reading of the following description and appended drawings.

BRIEF DESCRIPTION OF THE DRAWINGS

FIG. 12 is a view indicating how visual feature quantities are illustratively classified;

FIG. 13 is a view listing visual feature quantities to be computed for the entire image;

FIG. 14 is a view listing visual feature quantities to be computed for partial objects;

FIG. 26 is a view of an input image to which a texture direction component, a texture strength component, an index image and a line index image are added so that lines and points of the image may also be analyzed;

FIGS. 27A and 27B are views explaining a typical line index image;

FIG. 28 is a view explaining how an image feature table may record straight lines and vanishing points;

FIG. 29 is a view of a sensitive language example displayed by an analysis result presenting unit 6 of the embodiments;

FIG. 31 is a view of a display example given by a design know-how/plan presenting unit of some of the embodiments;

FIG. 42 is a view of the result of image analysis indicating the improvement in image stableness;

DESCRIPTION OF THE PREFERRED EMBODIMENTS

The preferred embodiments of the present invention will now be described with reference to the accompanying drawings.

[First Embodiment]

Figure 1:
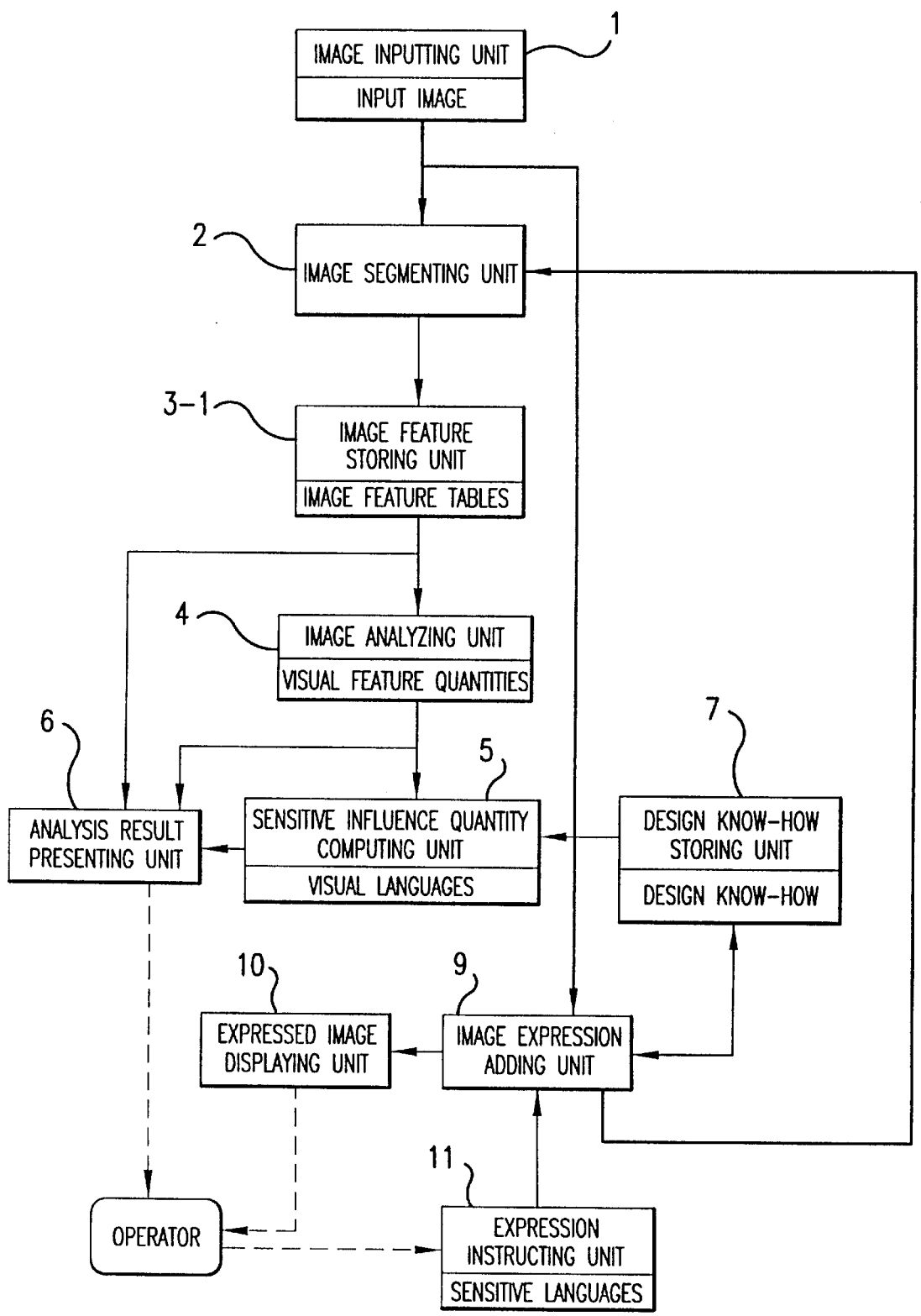
FIG. 1 is a block diagram of an image analyzing and expression adding apparatus practiced as a first embodiment of the invention.

The first embodiment of the invention is described below by referring to FIG. 1. In FIG. 1, an image inputting unit 1 inputs a full-color image described in a color space constituted by such colors as L*, a*, b*, red, green and blue (RGB). An image segmenting unit 2 segments the input image into a plurality of areas on the basis of colors and textures. The segmented areas (i.e., their physical feature quantities) are suitably arranged and placed into an image feature table in an image feature storing unit 3-1. Using the image feature table thus stored, an image analyzing unit 4 computes the feature quantities having visual significance (called visual feature quantities hereunder). On the basis of the visual feature quantities and design know-how in a design know-how storing unit 7, a sensitive influence quantity computing unit 5 computes sensitive language (i.e., a term or a set of terms representing impressions of the image). An analysis result presenting unit 6 displays an image feature table from the image feature storing unit 3-1, visual feature quantities from the image analyzing unit 4, and the visual language from the sensitive influence quantity computing unit 5. Given the result of analysis displayed on the analysis result presenting unit 6, an operator operates an expression instructing unit 11 to instruct the sensitive language to be added. An image expression adding unit 9 requests the design know-how storing unit 7 to furnish design know-how corresponding to the instructed sensitive language. When supplied with the design know-how from the design know-how storing unit 7 and with the image feature table, the image expression adding unit 9 adds expressions to the image that was input and held by the image inputting unit 1. The image thus supplemented with additional expressions is displayed or output by an expressed image displaying unit 10. The expression-supplemented image is also sent to the image segmenting unit 2 wherein the same process performed on the input image is again carried out. The result of the process is displayed by the analysis result presenting unit 6. The operator checks the two kinds of display. If the results are deemed satisfactory, the operator terminates the process. Otherwise the operator operates the expression instructing unit 11 to give further instructions to the image expression adding unit 9.

The flow of the processing by the embodiment in FIG. 1 will now be described in more detail. The operator first inputs the image desired to be supplemented by expressions through the use of the image inputting unit 1. The input image is segmented by the image segmenting unit 2 into a plurality of areas. The process of image segmentation may by facilitated by means of the k-means algorithm or the like using color information, provided that the image is segmented into areas suitable for adding expressions thereto. For this reason, it is preferable to use illustratively the division k-means algorithm described in the technical report of the Institute of Electronics, Information and Communication Engineers of Japan, D-II, Vol. J78-D-II, No. 2, pp. 221–228. This algorithm is designed to divide an image into a plurality of target areas separated by boundary areas. The target areas and adjacent boundary areas are grouped together and subjected successively to the k-means algorithm for image segmentation. The boundary areas are segmented in duplicate into areas so as to force the segmented areas into a staggered state along segmenting border lines.

When the process of the division k-means algorithm above is finished, all pixels are provided with the number of the area (i.e., index) to which each pixel belongs. The area numbers along with the features specific to each of the areas are written to an image feature table. The features of the areas include at least mean brightness per area, mean chroma per area, mean chromaticity per area, the center of gravity (x, y) per area, the number of pixels per area, and the area numbers. The indices are added to the input image, and are stored along with the image in the image inputting unit 1. The image feature table is stored in the image feature storing means 3-1.

The image analyzing unit 4 then computes visual feature quantities on the basis of the information held in the image feature table. As shown in FIG. 12, the visual feature quantities fall into two categories: those describing the image as a whole, and those describing partial objects. Typical visual feature quantities describing the image as a whole are listed in FIG. 13, and those describing partial objects are shown in FIG. 14. The first embodiment deals with the visual feature quantities describing the entire image. In particular, ways will be described below in which to acquire the following: mean value of brightness, dispersion of brightness, mean value of unit heaviness, center of heaviness, degree of dispersion of unit heaviness, asymmetry, mean value of unit lightness, center of lightness, degree of dispersion of unit lightness, vector from the center of heaviness to the center of lightness, dispersion of unit warmness, dispersion of unit coolness, mean value of unit warmness, center of warmness, mean value of unit coolness, center of coolness, vector from the center of warmness to the center of coolness, mean value of chroma, dispersion of chroma, frequency of rhythm of cool and warm colors, direction of rhythm of cool and warm colors, strength of rhythm of cool and warm colors, frequency of rhythm of brightness and darkness, direction of rhythm of brightness and darkness, and strength of rhythm of brightness and darkness.

Figure 17:
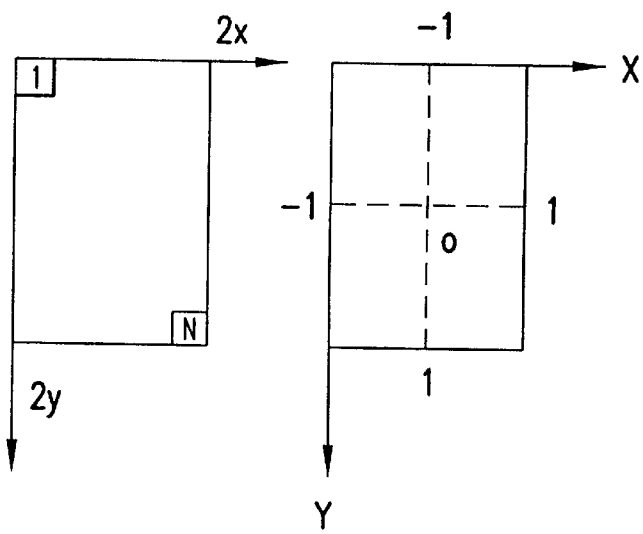
FIG. 17 is a view of coordinates in which to represent an image.

In the description that follows, Nn stands for the number of pixels included in an area n; Hn, V and Cn ($0 \leq$ Hn, Vn, Cn<255) denote the mean chromaticity, mean brightness and mean chroma of the area n respectively; N indicates the total number of pixels; x represents half the number of vertically arranged pixels in an image; y stands for half the number of horizontally arranged pixels in an image; (Xn, Yn) denotes the coordinates of the center of gravity for the area n divided respectively by x and y, minus 1 each; and o means the origin of an image (see FIG. 17).

(Visual Feature Quantities Associated with Brightness)

The visual feature quantities associated with the brightness of the image are computed by use of the following formulas:

Mean value of brightness La=$\Sigma$VnNn/N,

Dispersion of brightness=$\Sigma\{(Vn-La)^2 Nn\}/N$.

The symbol Σ represents the summation for the area n.

(Visual Feature Quantities Associated with Composition)

The visual feature quantities associated with the composition of the image are computed by use of the following formulas:

Mean value of unit heaviness=$\Sigma\{h(Vn) \times Nn\}/N$.

The perceived heaviness of one pixel belonging to the area n is defined as the unit heaviness h(Vn). The perceived heaviness of the area n (i.e., unit heaviness of area n) is represented by xNn. With the first embodiment, h(Vn)=255−Vn.

Center of heaviness (Xh, Yh)=$(\Sigma\{h(Vn) \times Nn \times Xn\}/\Sigma\{h(Vn) \times Nn\}$, $\Sigma\{h(Vn) \times Nn \times Yn\}/\Sigma\{h(Vn) \times Nn\})$, Degree of dispersion of unit heaviness=$(\Sigma\{h(Vn) \times (Xh-Xn)^2\}/\Sigma h(Vn), \Sigma\{h(Vn) \times (Yh-Yn)^2\}/\Sigma h(Vn))$, Asymmetry = |heaviness of image part I1 − heaviness of image part I4| + |heaviness of image part I2 − heaviness of image part I3|/(heaviness of the entire image).

Figure 20:
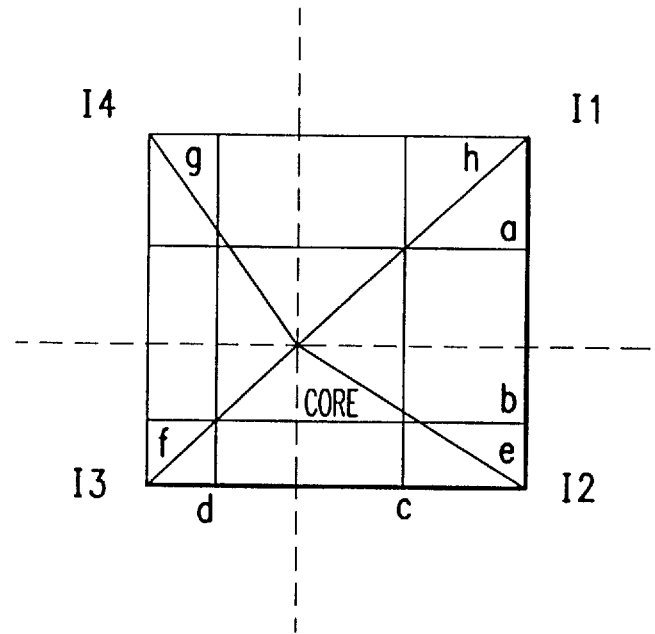
FIG. 20 is a view showing the core position of an image and the loci for obtaining a rhythm of that image.

In obtaining asymmetry, a vertical and a horizontal line passing through the image core ((center of heaviness+center of lightness)/2) are initially drawn so that the image is divided into four equal parts I1, I2, I3 and I4, as shown in FIG. 20.

Mean value of unit heaviness=$\Sigma(1(Vn) \times Nn)/N$.

With the first embodiment, 1(Vn)=Vn.

Center of lightness (X1, Y1)=$(\Sigma\{1(Vn) \times Nn \times Xn\}/\Sigma\{1(Vn) \times Nn\}$, $\Sigma\{1(Vn) \times Nn \times Yn\}/\Sigma\{1(Vn) \times Nn\})$, Degree of dispersion of unit heaviness=$(\Sigma\{1(Vn) \times (Xh-Xn)^2\}/\Sigma 1(Vn), Ef\{(Vn) \times (Yh-Yn)^2\}/\Sigma 1(Vn))$, Magnitude of vector from the center of heaviness to the center of lightness=$((X1-Xh)^2+(Y1-Yh)^2)^{1/2}$, Direction of vector from the center of heaviness to the center of lightness=$\tan^{-1}((Y1-Yn)/(X1-Xh))$.

(Visual Feature Quantities Associated with Colors)

The visual feature quantities associated with the colors of the image are computed by use of the following formulas:

Mean value of unit warmness Hw=$\Sigma\{w(Hn) \times Nn\}/N$,

Dispersion of unit warmness=$(\Sigma\{(w(Hn)-Hw)^2 \times Nn\}/N$,

Center of warmness (Xw, Yw)=$(\Sigma\{w(Hn) \times Nn \times Xn\}/\Sigma\{w(Hn) \times Nn\}, \Sigma\{w(Hn) \times Nn \times Yn\}/\Sigma\{w(Hn) \times Nn\})$.

Figure 18:
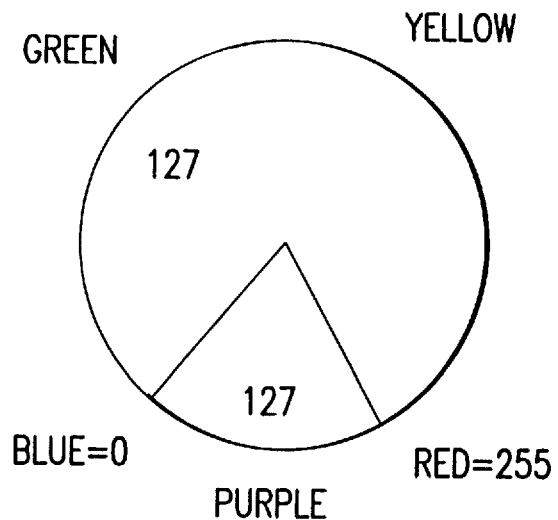
FIG. 18 is a view of an example in which units of warmness are numerically expressed.

With the first embodiment, w( ) is 0 for blue and 255 for red. The degrees involved range from 0 to 255, arranged in such a manner that in the direction passing through green, green equals 127 and that in the direction passing through purple, purple also equals 127 (see FIG. 18).

Mean value of unit coolness Hc=$\Sigma\{c(Hn) \times Nn\}/N$,

Dispersion of unit coolness=$(\Sigma\{(c(Hn)-Hc)^2 \times Nn\}/N$,

Center of coolness (Xc, Yc)=$(\Sigma\{c(Hn) \times Nn \times Xn\}/\Sigma\{c(Hn) \times Nn\}, \Sigma\{c(Hn) \times Nn \times Yn\}/\Sigma\{c(Hn) \times Nn\})$.

Figure 19:
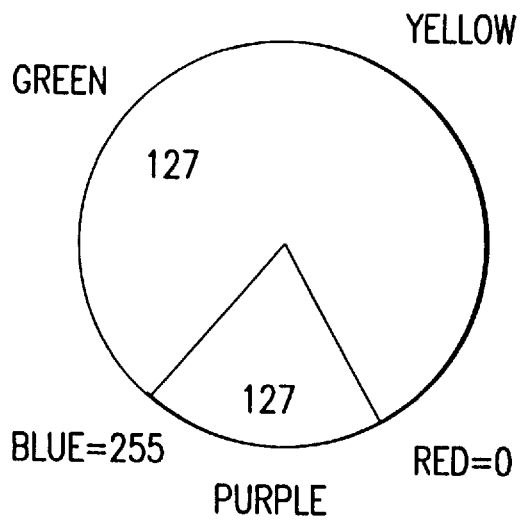
FIG. 19 is a view of an example in which units of coolness are numerically expressed.

With the first embodiment, c( ) is 255 for blue and 0 for red. The degrees involved range from 0 to 255, arranged in such a manner that in the direction passing through green, green equals 127 and that in the direction passing through purple, purple also equals 127 (see FIG. 19).

Mean value of chroma Ca=$\Sigma C n N n /N$,

Dispersion of chroma=$\Sigma\{(Cn-Ca)^2 Nn\}/N$.

(Visual Feature Quantities Associated with Rhythms)

The visual feature quantities associated with the rhythms of the image are computed by use of the following formulas:

Frequency of rhythm of cool and warm colors = positive − negative (+, −) alternating count/number of areas transited by line segments, Strength of rhythm of cool and warm colors=mean displacement quantity.

The positive-negative alternating count, the number of areas transited by line segments, and the displacement quantity are defined as follows: the position determined at (center of heaviness+center of lightness)/2 is called the core of the image. A vertical and a horizontal line passing through the core are drawn. The two lines segment the image into four areas. Four line segments a, b, c and d are then drawn so as to segment each of the areas into four equal parts. Four line segments e, f, g and h are extended from the core to the four corners of the image (see FIG. 20). Changes in the value w(Hn) are obtained along the line segments a, b, c, d, e, f, g and h. The direction in which the value w(Hn) increase is positive (+), and the direction in which the value drops is negative (−). On each of the line segments a, b, c, d, e, f, g and h, the number of times the positive (+) and negative (−) directions are alternated is obtained, along with the number of areas transited by the line segments and the quantity of displacement involved.

Frequency of rhythm of brightness and darkness=positive-negative (+, −) alternating count, Strength of rhythm of brightness and darkness=mean displacement quantity.

The positive-negative alternating count and the displacement quantity are defined as follows: changes in the value 1(Vn) are acquired along the line segments a, b, c, d, e, f, g and h. The direction in which the value 1(Vn) increase is positive (+), and the direction in which the value drops is negative (−). On each of the line segments a, b, c, d, e, f, g and h, the number of times the positive (+) and negative (−) directions are alternated is obtained, along with the quantity of displacement involved.

Figure 22:
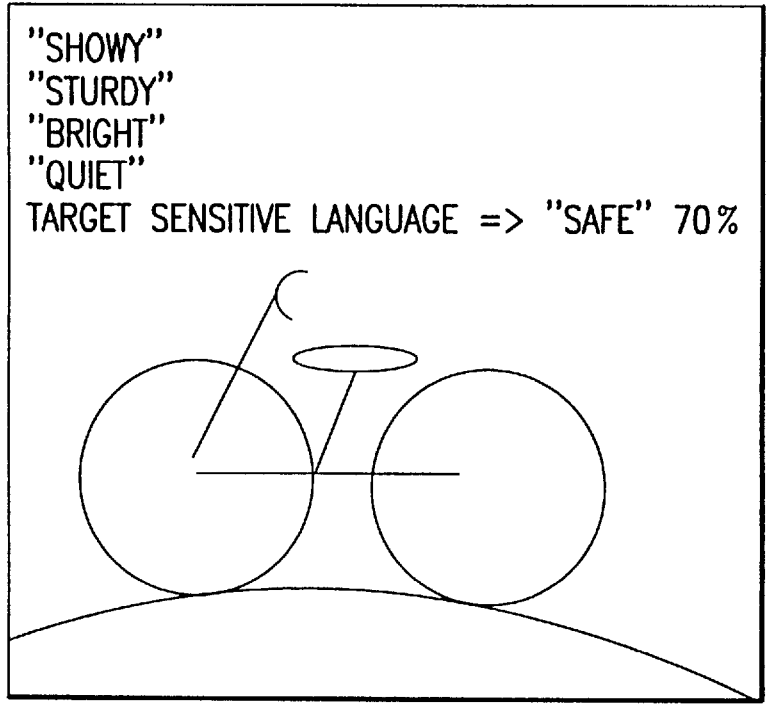
FIG. 22 is a view of a screen displaying results of new analysis following the selection of a trimming alternative.

The visual feature quantities are computed in the above manner. Given these quantities, the sensitive influence quantity computing unit 5 computes the sensitive language closely associated with the image in accordance with previously prepared design know-how in the design know-how storing unit 7. The same kinds of sensitive languages are grouped together. For example, the sensitive languages "sad," "cold" and "gentle" constitute a group closely associated with chromaticity, whereas the sensitive languages "safe," "dynamic," "plain," "simple," "sporty" and "dangerous" constitute a group closely related to composition. Likewise, the sensitive languages "dramatic," "bright," "dark" and "courageous" make up a group closely associated with brightness, and the sensitive languages "joyful," "sad" and "quiet" form a group closely linked to rhythm. For each of such sensitive language groups, the analysis result presenting unit 6 displays the sensitive language most closely associated with the sensitivity expressed by the image. In the first embodiment, the analysis result presenting unit 6 appears as a child window within the expressed image displaying unit 10, as depicted in FIG. 22.

Referring to the contents of the analysis result, the operator gives instructions in sensitive language to the image expression adding unit 9. Given the instructions and on the basis of the information in the design know-how storing unit 7, the image expression adding unit 9 modifies the image and presents the result to the expressed image displaying unit 10. With the first embodiment, the modifications added by the image expression adding unit 9 comprise changes in trimming, mean chroma and mean brightness.

Returning to the above-described bicycle retailer's sales campaign using leaflets, suppose that the input and analysis of the photograph showing the mountain bicycle resulted in the perceptions of the image as "calm" in chromaticity, as "dangerous" in composition, as "bright" in brightness, and as "quiet" in rhythm. To obtain the target expressive effects in this case requires changing the perception "calm" into "gentle" and supplementing the image with more stableness.

Figure 21:
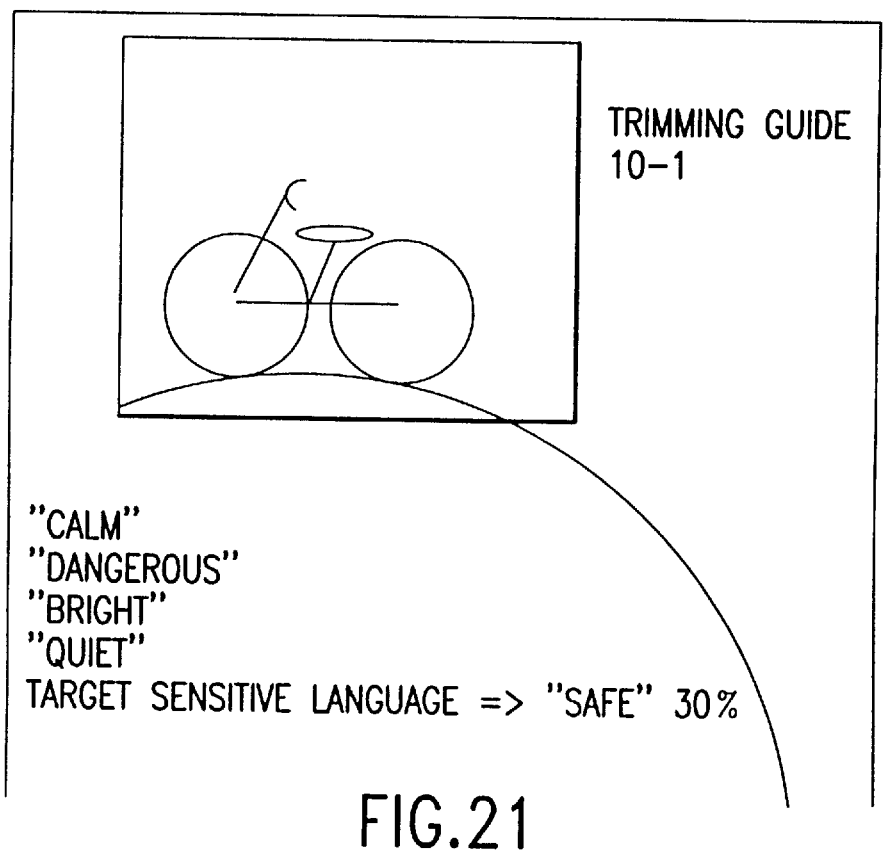
FIG. 21 is a view of a single screen collectively displaying an input image, results of image analysis, and a trimming guide.

Sensitive languages are to be added one at a time, beginning with the sensitive language group associated with composition. From the predetermined set of sensitive languages, the term "safe" is selected, and instructions reflecting the selection are given to the image expression adding unit 9 via the expression instructing unit 11. The design know-how storing unit 7 judges that trimming needs to be modified because the sense of stableness is a sensitive language associated with the composition of the image. Thus a trimming guide 10-1 is displayed along with the image on the expressed image displaying unit 10, as illustrated in FIG. 21. The proportion of the sense of stableness expressed by the image within the trimming guide 10-1 is indicated in percentage points. With the first embodiment, the sensitive language "safe" is associated with the center of heaviness, i.e., $$(Xh, Yh) = (\Sigma h\{(Vn) \times Nn \times Xn\}/\Sigma\{h(Vn) \times Nn\},$$
$$Yh = \Sigma\{h\{(Vn) \times Nn \times Yn\}/\Sigma\{h(Vn) \times Nn\}).$$

The closer the value Xn to 0 and the closer the value Yh to 1, the "safer" the impression. The computed value is expressed as: $100[1-\{(0-Xh)2+(1-Yn)2/8\}]\%$. The result is displayed together with the image shown in FIG. 21. Watching the value displayed in real time on the screen, the operator using an input device such as a mouse moves, enlarges or contracts the trimming guide 10-1. After such adjustments, the trimming guide 10-1 may be fixed where the value representing the sense of safety is sufficiently large and where the desired trimming is achieved.

In this image analyzing and expression adding apparatus, once the input image is segmented, any modifications in trimming allow the image feature table to be corrected easily without preparation of a new image feature table. Because it is not necessary to go through another image segmentation that takes time the most, changes in trimming still leave the visual feature quantities and sensitive language computed promptly from the corrected image feature table and displayed in real time.

Figure 23:
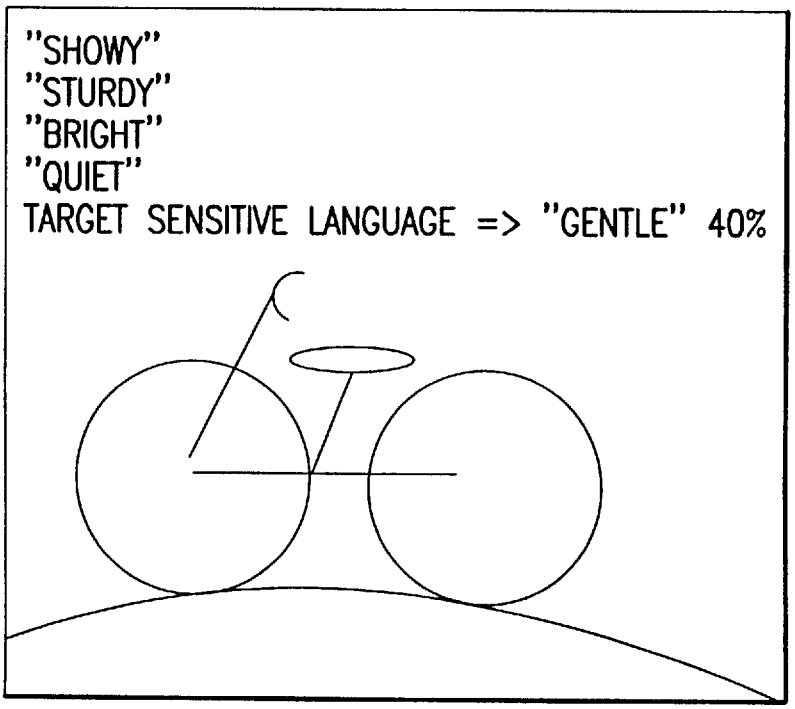
FIG. 23 is a view of a display example in which the next target sensitive language "gentle" is input.
Figure 24:
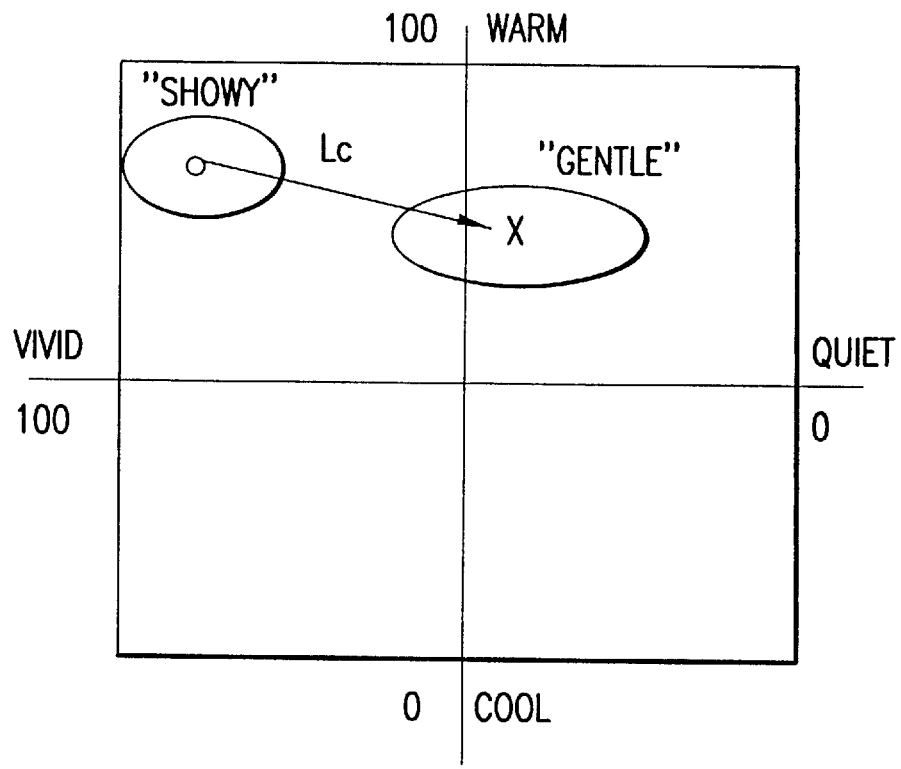
FIG. 24 is a view of a visual language space established on the axes of warmness and vividness.
Figure 25:
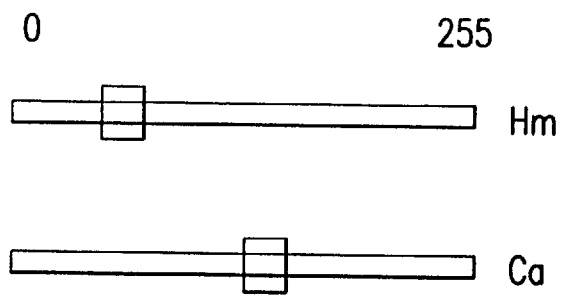
FIG. 25 is a view of a typical slide type number input device.

FIG. 22 shows a display example in which the trimming guide 10-1 is fixed and determined. A trimmed image is shown to be enlarged on the screen. The currently displayed image has its center of gravity lowered so as to increase symmetry, whereby the impression "unstable" is replaced by the impression "safe." However, whereas the green mountain ranges spreading across the screen gave the "calm" impression before, a red bicycle enlarged and coming to the fore now gives the "showy" impression. The impression "showy" needs to be replaced here by the impression "gentle." The sensitive language that expresses hue is associated with two quantities: mean value of unit warmness $Hm=\Sigma W(Hn)Nn/N$, and mean value of unit vividness $Ca=\Sigma CnNn/N$. The impression "showy" corresponds to the case where both the mean value of unit warmness Hm and the mean value of unit vividness Ca are high. To replace the "showy" impression with "gentleness" requires lowering the mean value of unit vividness Ca. When the operator inputs the impression "gentle," the sensitive influence quantity computing unit 5 computes the distance Lc between the current point o and the center x of the area where "gentleness" is expressed in a space formed on the vividness and warmness axes, as shown in FIG. 24. The sensitive influence quantity computing unit 5 supplies the analysis result presenting unit 6 with a readjusted value of "gentleness" that is larger the shorter the computed distance Lc. That is, the displayed value is $(141-Lc)/141) \cdot 100\%$. With the first embodiment, as depicted in FIG. 23, the analysis result presenting unit 6 appears as a child window within the expressed image displaying unit 10. Watching the image and the value representing "gentleness," the operator instructs the system to change the values Hm and Ca. A typical manner of such instruction is for the operator to move the knobs of a slide type number input device displayed on the screen using a physical input device such as a mouse. Manipulating the knobs on the screen, the operator changes the values Hm and Ca to increase the value representing "gentleness" until the image becomes pleasing to him or her, whereupon the knobs are fixed on the screen. The first embodiment thus allows anyone with little specialized knowledge to analyze the input image and to add suitable expressions thereto easily in real time.

The first embodiment of the invention is arranged to display not only the sensitive language belonging to the input image but also the sensitive influence quantities of the expressions to be added to the image. Alternatively, the first embodiment may be modified so as to let the operator simply check the sensitive language belonging to the input image. In such a case, the sensitive influence quantity computing unit 5 in FIG. 1 constitutes a sensitive language determining means for determining the sensitive language belonging to the input image, and the analysis result presenting unit 6 displays the sensitive language determined by the sensitive language determining means 5.

The sensitive influence quantity computing unit 5 of the first embodiment is intended simply to compute the sensitive influence quantities of the sensitive language instructed via the expression instructing unit. Alternatively, the sensitive influence quantity computing unit may be modified so as to compute and display not only the sensitive influence quantities of the sensitive language instructed via the image instructing unit but also the sensitive influence quantities of the sensitive language belonging to the input image.

[Second Embodiment]

Figure 2:
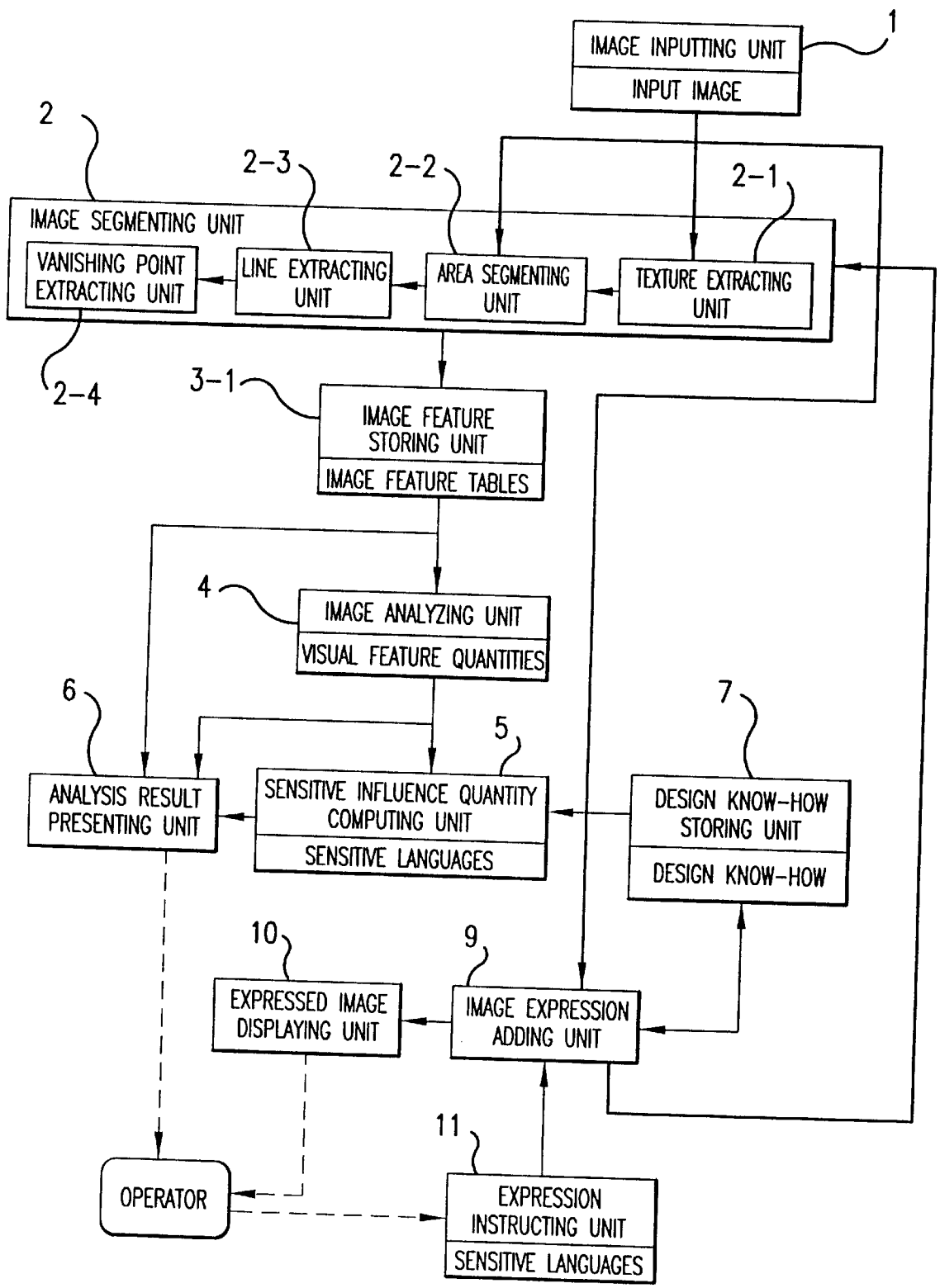
FIG. 2 is a block diagram of a second embodiment of the invention implemented by supplementing an image segmenting unit 2 of the first embodiment with the ability to extract lines and points from an image.

The second embodiment of the invention will now be described with reference to FIG. 2. In FIG. 2, those parts with their counterparts already shown in FIG. 1 are given the same reference numerals, and detailed descriptions of the parts are omitted where they are repetitive. In FIG. 2, the image segmenting unit 2 is made up of a texture extracting unit 2-1, an area segmenting unit 2-2, a line extracting unit 2-3 and a vanishing point extracting unit 2-4. The texture extracting unit 2-1 extracts a texture from the input image that was input and held by the image inputting unit 1. Given the extracted texture and the input image, the area segmenting unit 2-2 segments the image into a plurality of areas of equal quality. The features of the areas are written to an image feature table of the image feature storing unit 3-1. The line extracting unit 2-3 extracts line segments from the edges of the areas segmented by the area segmenting unit 2-2. The features of the line segments are written to the image feature table. The vanishing point extracting unit 2-4 computes points of intersection on the extracted edges and on their extensions. The computed intersection points are also written to the image feature table.

Whereas the first embodiment has its image segmenting unit 2 creating an image feature table through area segmentation alone, the second embodiment not only segments the image into areas but also extracts line segments and vanishing points therefrom. Furthermore, elements of the extracted texture are allowed to be taken into consideration during area segmentation. Initially, the texture extracting unit 2-1 extracts a texture direction component and a texture strength component from the input image. Given the extracted components and the input image, the area segmenting unit 2-2 segments the image into appropriate areas. The above area segmentation is accomplished by executing the k-means algorithm in such a manner that the distance between the direction component of the target pixel and the direction component of the center pixel is minimized.

With the above process completed, the image feature table has added thereto the direction component TEd of the representative texture in each area and the ratio TEn of those pixels having texture strengths higher than a predetermined level, to the pixels making up the area (i.e., texture strength of the area), in addition to the information discussed in connection with the first embodiment. The line extracting unit 2-3 extracts straight lines from the border lines of the areas obtained through area segmentation. How such straight lines are extracted will now be described in detail with reference to the image example of FIGS. 27A and 27B. The indexed image obtained from the area segmentation process of FIG. 26 has the pixels of the same area provided with the same index. It follows that the border lines of the areas exist only where the indices change. The pixels adjacent to such index changes are marked to form an image as shown in FIGS. 27A and 27B. The pixels of the marked image are scanned successively starting from the top left corner. Wherever a marked pixel is detected, a check is made to see if any applicable straight line exists. The check is performed as follows: a window is first composed of a rectangle of five pixels by five pixels, with the pixel in question located at the center of the rectangle. In the lower half portion of the peripheral pixels marked around the target pixel in FIG. 27B, i.e., in the portion indicated as the range where a value a may be applied variably, a straight line defined as y=ax+b is drawn between the target pixel on the one hand, and the marked peripheral pixels on the other hand. In the example of FIG. 27B, four straight lines are drawn. It is assumed here that the smallest value a is represented by a' and the largest value a by a". In the equation: y=ax+b, the value a is varied at short intervals within the range of a'<a<a". The value a is selected and fixed where the equation formed with that value constitutes the longest straight line that aligns with a border line. With the second embodiment, the value a is varied illustratively at intervals of n/16. Of the pixels transited by the straight lines defined by the above equation, those pixels that are contiguous and marked are counted. Where the largest number of such pixels is counted, the straight line applicable at that point has its gradient defined by the value a. This straight line is called a border straight line. The number of pixels transited by straight lines is obtained by first moving along each straight line at intervals of 0.1 pixel and by counting the pixels containing those points of movement. When the value a is determined, the value b is automatically fixed. The image feature table accommodates the set of values a and b thus acquired, the coordinates (1xl, 1yl) of the pixel in question and the number of pixels 1nl applicable to the border straight line, together with the index of straight line l (see FIG. 28). Of those pixels in the line index image which are in the same locations as the applicable pixels and of the eight pixels adjacent to each of the applicable pixels, the marked pixels are selected and given index 1 each. When this process is completed, the pixels that are marked but not given numbers in the line index image are detected and the same process is repeated. When all pixels that are marked but not numbered in the line index image have been exhausted, the process is terminated.

When the above processing is completed, the second embodiment checks which border straight lines are included in which areas and counts the number of these lines in each of the areas. The results are written to the image feature table.

The vanishing point extracting unit 2-4 then extracts vanishing points using the information about the extracted lines. One method for extracting vanishing points is proposed by Atsushi Sakata et al., in "An Attempt to Analyze Paintings by Computer," technical paper SD-10-1 read at the Spring 1993 Conference of the Institute of Electronics, Information and Communication Engineers of Japan. Described below is another method for extracting vanishing points. First, border straight lines on which the number of applicable pixels exceeds a predetermined count are selected. All such border straight lines are transferred onto points on the Hough plane using the formula: $x\cos\theta + y\sin\theta = \rho$. On the Hough plane, a locus defined as $xi\cos\theta + yi\sin\theta = \rho$ passing near at least three separate points is searched for. When any such locus is found, the point (xi, yi) thereon is determined as a vanishing point. The number of each vanishing point is written to the image feature table along with $\theta$ and $\rho$ for a group of straight lines forming the vanishing point in question. When all loci have been found, the process is terminated.

In the manner described, the second embodiment allows areas, lines and vanishing points to be extracted from the image. Using the information thus obtained, the image analyzing unit 4 computes new visual feature quantities in the manner to be described below. For use in the computing process, the information about the numbers of vanishing points as well as the layout thereof may be retrieved unmodified from the image feature table.

Visual feature quantities are computed anew as follows:

Direction of texture = direction of texture for areas accounting for at least 60% of all areas when histogram is taken in the area texture direction, -continued Strength of texture = mean strength of texture of areas having the same direction component as the direction of texture for maximum population, Strength of perspective = $a1 \times (\pi -$ mean value of gradients of straight lines forming vanishing point),
when mean value of gradients of straight lines forming the vanishing point of a depth $> \pi/2$;

$a1 \times$ (mean value of gradients of straight lines forming vanishing point), when mean value of gradients of straight lines forming the vanishing point of a depth $\leq \pi/2$.

The notation a1 represents a suitable coefficient.

Strength of vanishing point=$a2 \times$number of straight lines forming vanishing point.

The notation a2 stands for a suitable coefficient.

Complexity of border lines = $a3 \times$ (number of points for expressing border lines by mapping such lines belonging to the same area on Hough plane).

The notation a3 denotes a suitable coefficient.

Linearity of border lines = $a4 \times$ number of border straight lines belonging to the same area/mean quantity
of change ($|\Delta\theta|$) in effect when border straight lines
belonging to the same area are mapped successively on Hough plane.

The notation a4 represents a suitable coefficient.

[Third Embodiment]

Figure 3:
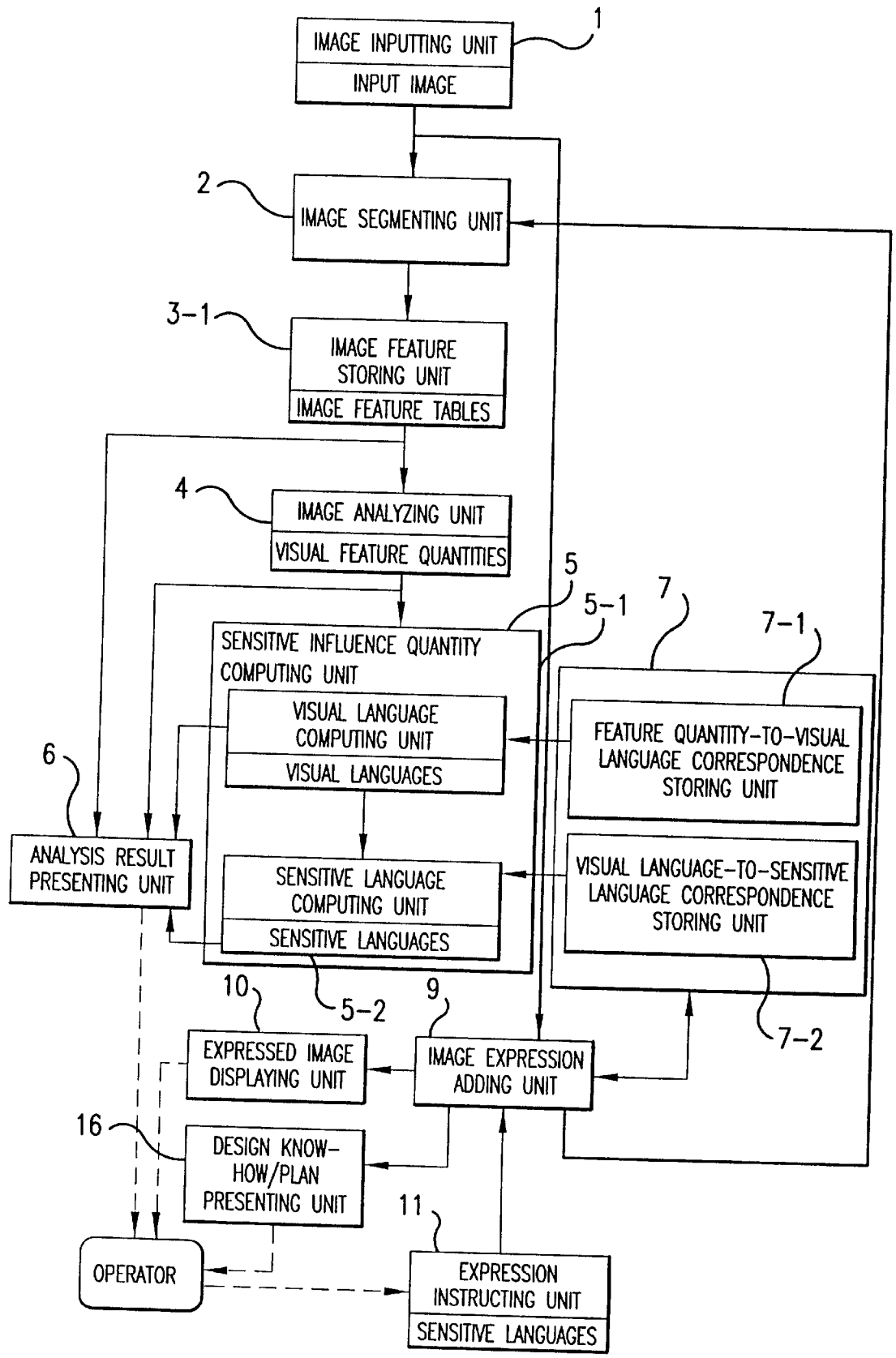
FIG. 3 is a block diagram of a third embodiment of the invention implemented by dividing a design know-how storing unit 7 and a sensitive influence quantity computing unit of the first embodiment into two parts each so as to deal with visual language.

The third embodiment of the invention will now be described with reference to FIG. 3. In FIG. 3, those parts with their counterparts already shown in FIG. 1 or 2 are given the same reference numerals, and detailed descriptions of the parts are omitted where they are repetitive. The sensitive influence quantity computing unit 5 and the design know-how storing unit 7 are described first by referring to FIG. 3. A visual language computing unit 5-1 in the sensitive influence quantity computing unit 5 computes visual language (i.e., a term or a set of terms expressing visual features) based on the visual feature quantities computed by the image analyzing unit 4 and on the information stored in a feature quantity-to-visual language correspondence storing unit 7-1 in the design know-how storing unit 7. The computed result is displayed by the analysis result presenting unit 6. A sensitive language computing unit 5-2 in the sensitive influence quantity computing unit 5 computes sensitive language based on the computed visual language and on the information stored in a visual language-to-sensitive language correspondence storing unit 7-2 in the design know-how storing unit 7. The computed sensitive language is displayed by the analysis result presenting unit 6. The visual language-to-sensitive language correspondence storing unit 7-2 returns to the image expression adding unit 9 the visual language corresponding to the sensitive language instructed by the image expression adding unit 9. In addition, the feature quantity-to-visual language correspondence storing unit 7-1 returns to the image expression adding unit 9 the visual feature quantities corresponding to the visual language in question. Given the visual feature quantities, the image expression adding unit 9 adds expressions to the image accordingly.

In the first embodiment, the design know-how stored in the design know-how storing unit 7 is composed of sensitive language sets each comprising sensitive languages associated with the same visual feature quantity. This means that with the first embodiment, a whole set of design know-how needs to be changed every time a different group of viewers belonging to a different ethnic and/or age group is to be addressed. Furthermore, in building its design know-how, the first embodiment needs to analyze and reconstruct designers' know-how. However, the system of the first embodiment is incapable of utilizing unmodified visual languages that are commonly used by designers; designers' know-how must be translated into correspondences between visual feature quantities and sensitive languages. Thus it takes time and effort to build the sort of design know-how that is usable by the system.

The third embodiment proposes a solution to the above problem. Specifically, design know-how is divided into two layers: a layer of visual languages common to different ethnic groups, such as the impression of stableness given by the composition of an image; and a sensitive language layer which comes above the visual language layer and which comprises sensitive languages varying significantly depending on the ethnic and/or age group, such as the emotion prompted by colors.

Figure 10:
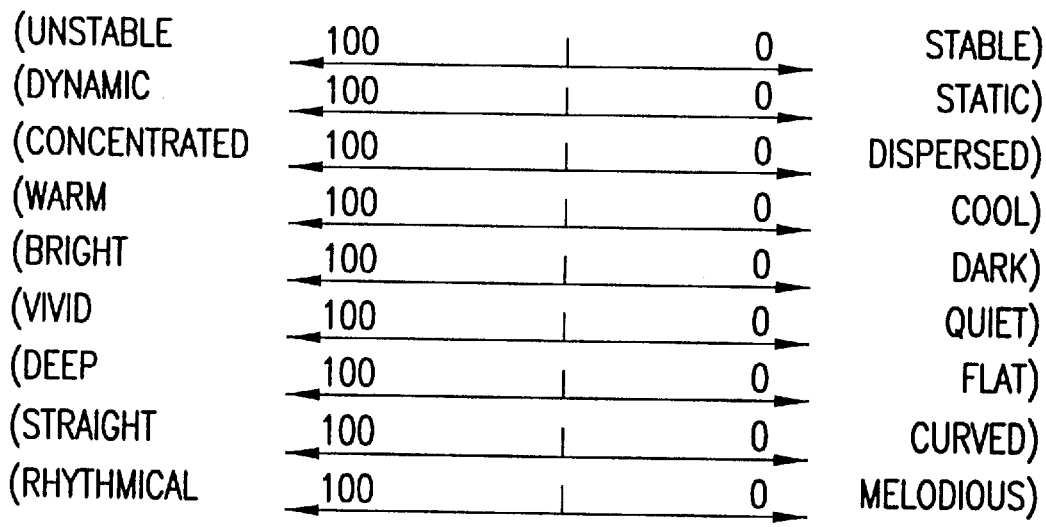
FIG. 10 is a view showing visual language axes constituting a visual language space for images having no structure.
Figure 11:
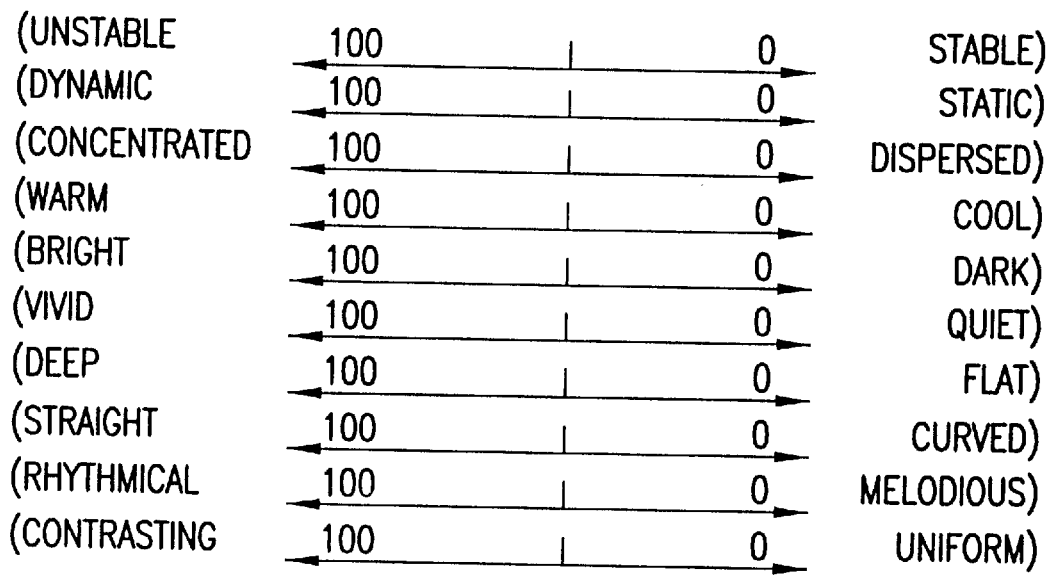
FIG. 11 is a view depicting visual language axes constituting a visual language space for images having structures.

As shown in FIG. 10, contradicting visual languages are placed on both ends of each of a plurality of number axes so as to prepare a set of visual languages. The visual language axes thus prepared are arranged so that they are independent of one another in terms of meaning. The example of FIG. 10 constitutes a nine-dimensional visual language space. Because visual languages have high levels of generality, once visual feature quantities are translated into visual languages, the latter may be used in an extensive range of applications.

Below is an example of creating visual languages out of visual feature quantities. FIG. 13 illustratively lists visual feature quantities closely associated with a number of visual language axes.

The visual feature quantities associated with the stable-unstable visual language axis include the following: magnitude of vector from the center of heaviness to the center of lightness, i.e., $G1=((X1-Xh)^2+(Y1-Yh)^2)^{1/2}$; direction of vector from the center of heaviness to the center of lightness, i.e., $Gd=\pi/2-\tan^{-1}((Y1-Yh)/(X1-Xh))$; and center of heaviness $(Xh, Yh)=(\Sigma\{h(Vn)\times Nn\times Xn\}/\Sigma h(Vn)\times Nn\}, \Sigma\{h(Vn)\times Nn\times Yn\}/\Sigma\{h(Vn)\times Nn\})$. The image is judged to be more stable the closer the value Xh to 0, the closer the value Yh to 1, the closer the direction of vector from heaviness center to lightness center to the perpendicular, and the greater the magnitude of vector from heaviness center to lightness center. In other words, unstableness in the image is expressed by the following formula:

Unstableness = $ka1 \times F\{1 - |0 - Xh|/4 - |1 - Yh|/4,$ $kb1\} \times 100 + ka2 \times F\{|2 - 2Gd/\pi|/4 + |2 - G1|/4, kb2\} \times 100\%,$ where unstableness is equated to 100% if the computed results exceed 100, and where $F\{x, k1\}=1/[\{1+\exp(k1-x)\}]$, ka1 and kb1 are suitable real numbers.

The visual feature quantities associated with the static-dynamic visual language axis include asymmetry, complexity of border lines, direction of representative image texture, and strength of representative image texture. With the third embodiment, visual languages are quantized by use of asymmetry, direction of representative image texture and strength of representative image texture. Motion in the image is expressed by the following formula:

Motion = $ka3 \times F$ {(|heaviness of image part $I1$ − heaviness of image part $I4$| + |heaviness of image part $I2$ − heaviness of image part $I3$|)/heaviness of the entire image, $kb3$} × 100 + $ka4 \times F$ {(number of areas having the same direction component as the direction of texture for maximum population × mean strength of texture for such areas)/(number of all areas × 255), $kb4$} × 100%, where motion is equated to 100% if the computed results exceed 100.

The visual feature quantities associated with the concentrated-dispersed visual language axis include the degree of dispersion of unit heaviness, degree of dispersion of unit lightness, center of heaviness, center of lightness, degree of dispersion of unit warmness, degree of dispersion of unit coolness, center of warmness, and center of coolness. With the third embodiment, the degree of concentration is computed by use of the degree of dispersion of unit heaviness, degree of dispersion of unit lightness, degree of dispersion of unit warmness, and degree of dispersion of unit coolness. The following formula is used for the computation:

Degree of concentration = $ka5 \times F$ {(|degree of dispersion of unit heaviness − degree of dispersion of unit lightness|/ (degree of dispersion of unit heaviness + degree of dispersion of unit lightness), $kb5$} × 100 + $ka6 \times F$ {(|degree of dispersion of unit warmness − degree of dispersion of unit coolness|/(degree of dispersion of unit warmness + degree of dispersion of unit coolness, $kb6$} × 100%, where the degree of concentration is equated to 100% if the computed results exceed 100.

The visual feature quantities associated with the warm-cool visual language axis include the type of representative image texture, strength of representative image texture, mean value of unit warmness, dispersion of unit warmness, center of warmness, mean value of unit coolness, dispersion of unit coolness, center of coolness, and vector from the center of warmness to the center of coolness. With the third embodiment, warmness in the image is computed by use of the following formula:

Warmness=(mean value of unit warmness−mean value of unit coolness)/(255×number of all pixels)×100%.

The visual feature quantities associated with the vivid-quiet visual language axis include the mean value of chroma and the degree of dispersion of chroma. With the third embodiment, vividness in the image is computed by use of the following formula:

Vividness=mean value of chroma/255×100%.

The visual feature quantities associated with the bright-dark visual language axis include the center brightness of maximum population, mean value of brightness and dispersion of brightness. With the third embodiment, brightness in the image is computed by use of the following formula:

Brightness=mean value of brightness/255×100%.

The visual feature quantities associated with the deep-flat visual language axis include the number of vanishing points, layout of vanishing points, strength of perspective, and strength of vanishing points. With the third embodiment, depth in the image is computed by use of the following formula:

Depth = $f$ {(number of vanishing points) × ((strength of perspective) + (strength of vanishing points)), $k7$} × 100%.

The visual feature quantities associated with the straight-curved visual language axis include the mean linearity of border lines, type of texture of maximum population, and strength of texture of maximum population. With the third embodiment, linearity in the image is computed by use of the following formula:

Linearity=f{average of (linearity of border lines) in all areas, $k8$}×100%.

The visual feature quantities associated with the rhythmical-melodious visual language axis include the following: frequency of rhythm of cool and warm colors, direction of rhythm of cool and warm colors, strength of rhythm of cool and warm colors, frequency of rhythm of brightness and darkness, direction of rhythm of brightness and darkness, strength of rhythm of brightness and darkness, direction of rhythm of texture, and strength of rhythm of texture. With the third embodiment, the degree of rhythmicity is computed on each of the straight lines a, b, c, d, e, f, g and h shown in FIG. 20 by use of the following formula:

Rhythmicity = $ka9 \times f$ {frequency of rhythm of cool and warm colors, $kb9$}100 + $ka10 \times f$ {frequency of rhythm of brightness and darkness,$kb10$} × 100%.

Of the degrees of rhythmicity thus computed, the maximum value is taken as the eventual degree of rhythmicity.

The visual language computing unit 5-1 computes visual languages using the formulas explained above. Where one visual language Vi corresponds to a plurality of visual feature quantities G1, G2, ... (0<G1<100, 0<G2<100, ...), the visual language Vi is computed as follows:

Vi=$ka12 \cdot F(G1, kb12) \cdot 100 + ka13 \cdot F(G2, kb13) \cdot 100 + ...$ , where Vi=100 if the computed results exceed 100. With such computations carried out, changes in even a single visual feature quantity exert a distinct influence on the visual language Vi. This allows images drawn by different techniques (i.e., with different visual feature quantities) to be analyzed on the scale of the same visual language.

Each visual language thus analyzed is displayed as a single point on a given number axis. FIG. 29 illustrates how degrees of unstableness are displayed on the applicable axis. The computed results are displayed by the analysis result presenting unit 6. Control is then passed on to the sensitive language computing unit 5-2. On each of the number axes for visual languages, sensitive languages closely associated with the axis in question are distributed as indicated in FIG. 29. Such correspondences between visual and sensitive languages are stored in the visual language-to-sensitive language correspondence storing unit 7-2. By referencing these correspondences, the sensitive language computing unit 5-2 causes the analysis result presenting unit 6 to display sensitive languages located close to the input image value indicated on each of the number axes for visual languages.

Figure 30:
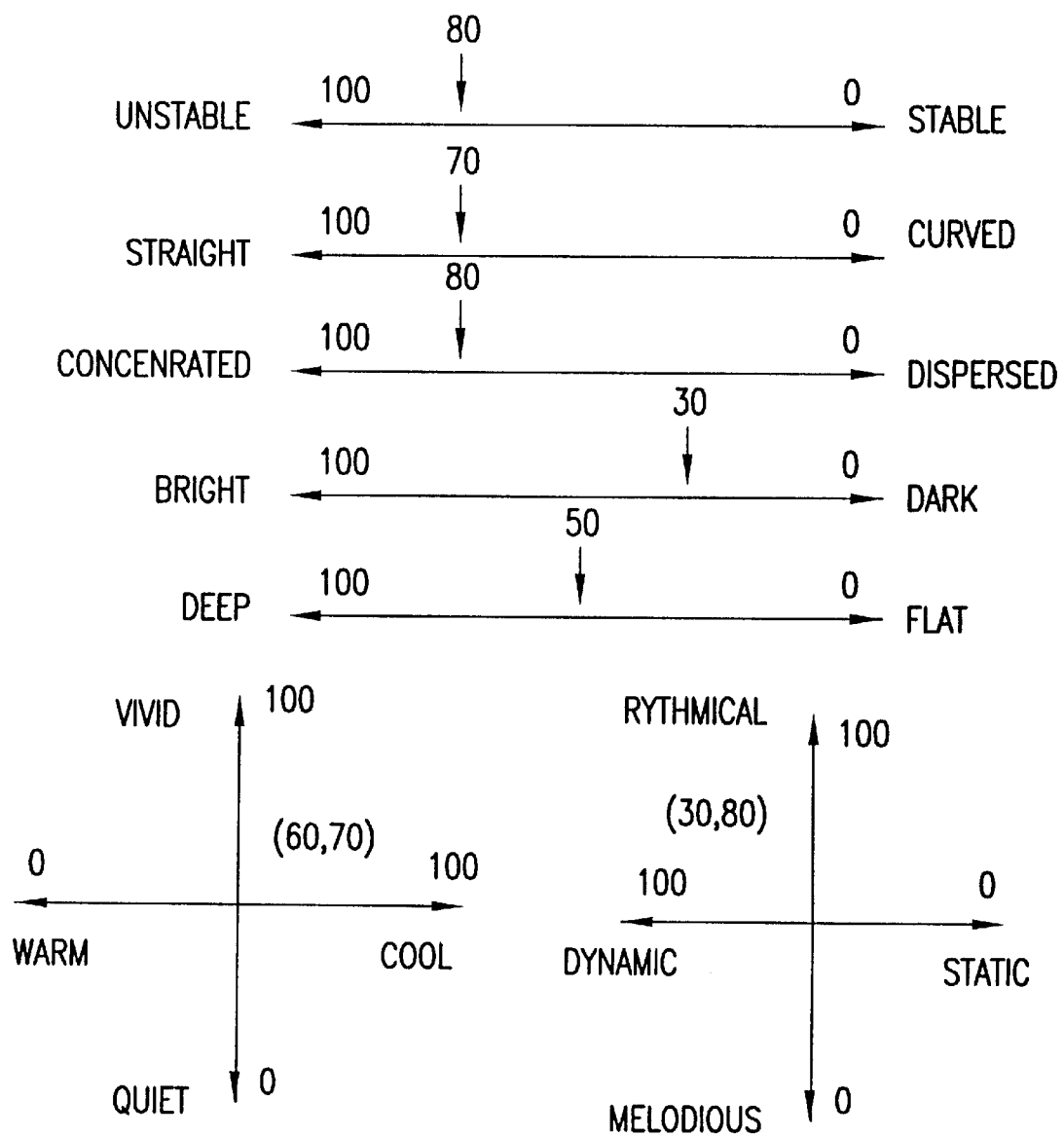
FIG. 30 is a view of an analysis example in visual language.

Since one sensitive language is generally associated with a plurality of visual languages, the sensitive languages shown along the visual language number axes should be taken only as a rule of thumb. Although visual languages are selected so as to be highly independent of one another, "vividness" and "warmness" should preferably be paired in correspondence to sensitive languages. Similarly, "motion" and "rhythmicity" should also be paired preferably in correspondence to sensitive languages. Specifically, such visual language axes as "stable-unstable," "concentrated-dispersed," "bright-dark," "deep-flat" and "straight-curved" may have their corresponding sensitive languages allocated thereon as a rule of thumb in a one-dimensional fashion, whereas such visual language axis pairs as "warm-cool" paired with "vivid-quiet," and "dynamic-static" paired with "rhythmical-melodious" may have their corresponding sensitive languages allocated thereon as a rule of thumb in a two-dimensional manner. FIG. 30 shows typical combinations of sensitive languages.

After sensitive and visual languages of the image have been analyzed and displayed, the user of the system draws up a design plan about the expressions to be added to the image by referring to the displayed sensitive and visual languages. To return to the above-described bicycle retailer's sales campaign, the sensitive languages emphasized in the design plan are "gentle," "sporty" and "safe," with their proportions of emphasis set for 2:1:1 respectively. These sensitive languages are first input via the expression instructing unit 11. In response to each of the input sensitive languages, a design know-how/plan presenting unit 16 displays the three most closely associated visual languages together with distances up to their corresponding current values in the image. The display is effected on the basis of the information held in the visual language-to-sensitive language correspondence storing unit 7-2. Because the sensitive language "gentle" needs to be emphasized more than the other two in the above example, visual languages "vivid/warm" and "bright" are selected to correspond with the sensitive language "gentle"; a visual language "motion/rhythmical" is selected to correspond with the sensitive language "sporty," and a visual language "unstable" is selected to correspond with the sensitive language "safe." Whereas the first embodiment could not handle the sensitive languages "sporty" and "safe" concurrently because they belong to the same group, the third embodiment circumvents this bottleneck by utilizing different visual languages.

Figure 32:
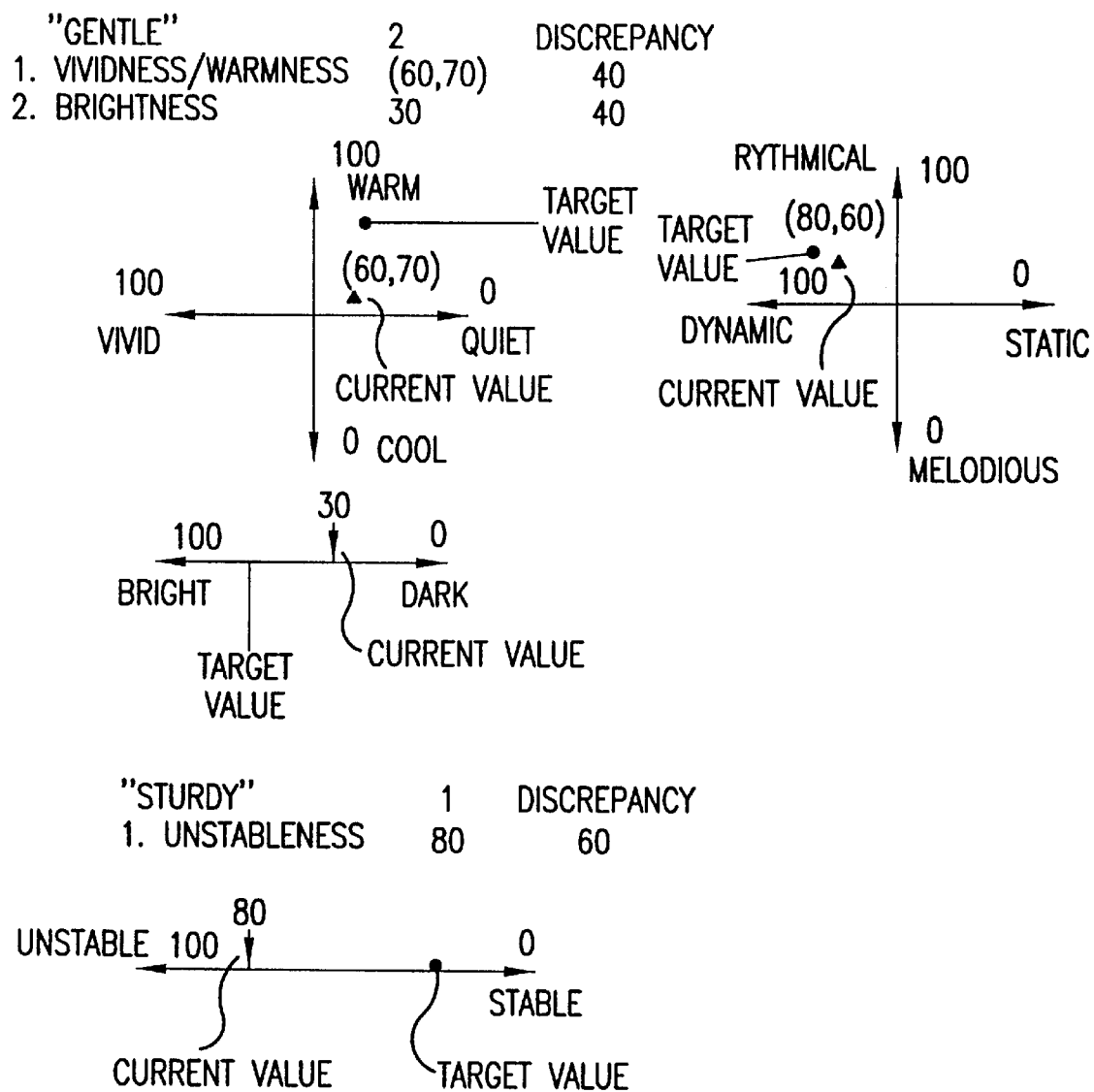
FIG. 32 is a view of an example in which current and target values of visual language are indicated.
Figure 33:
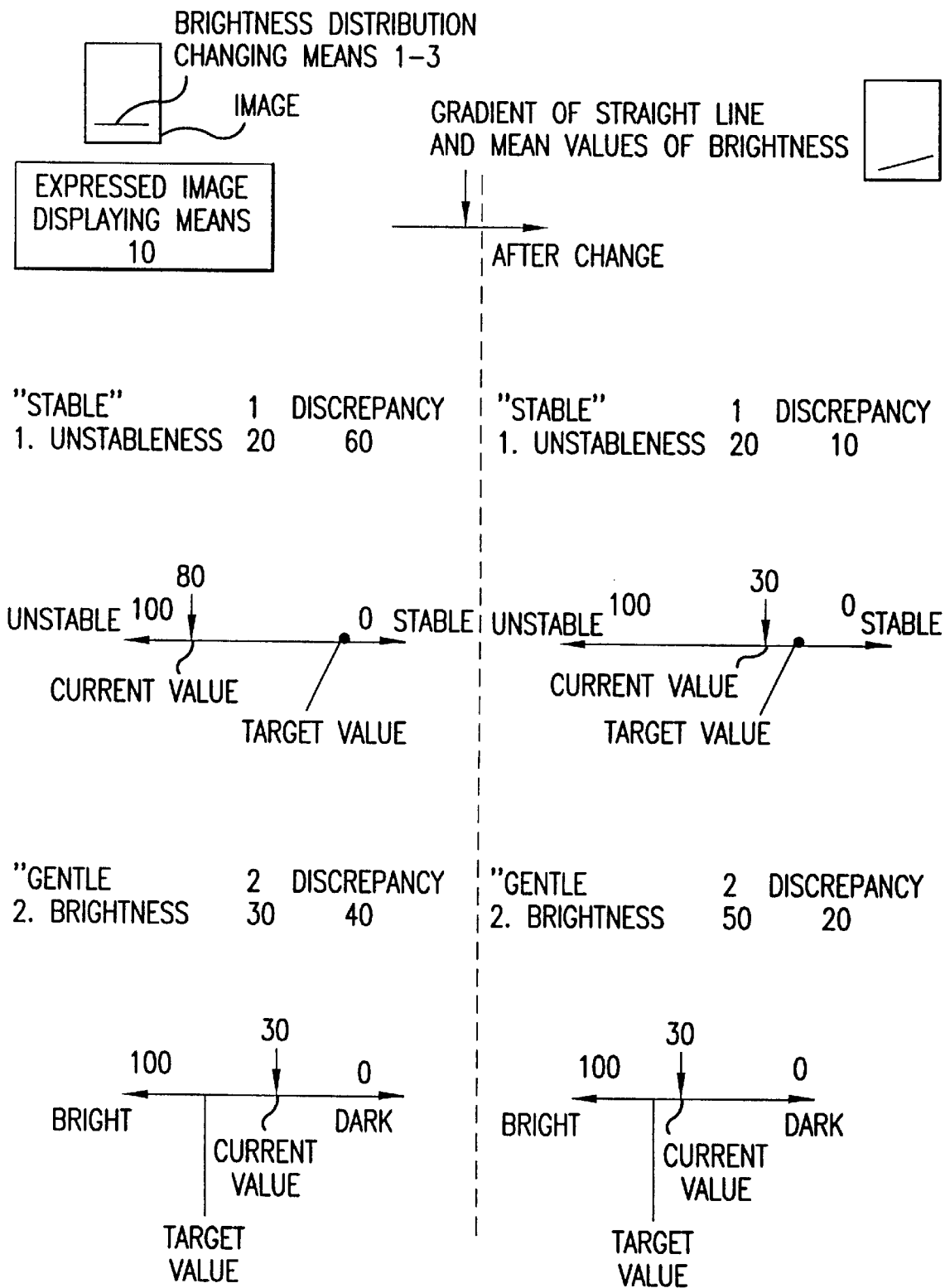
FIG. 33 is a view of an example in which the distribution of brightness is changed by a brightness distribution changing unit 10-3 of the embodiments.

On the basis of the design plan thus determined, the visual languages and their target values are input via the expression instructing unit 11. The system inquires the feature quantity-to-visual language correspondence storing unit 7-1 about the visual feature quantities corresponding to the input visual languages, and causes the design know-how/plan presenting unit 16 to display suitable visual feature quantities that are variable, as well as other necessary information. For example, as shown in FIG. 32, if it is deemed necessary to vary the distribution of area brightness in order to enhance stableness, the system causes the design know-how/plan presenting unit 16 to indicate that the variable visual feature quantity is the distribution of brightness. The expressed image displaying unit 10 displays a straight line by which to instruct a change in the distribution of brightness to the system (via a brightness distribution changing unit 10-3; see FIG. 33). With the distribution of brightness changed, the visual language "bright-dark" associated with the sensitive language "gentle" is affected thereby. Such visual languages that can change concurrently with a sensitive language change are displayed in the form of a warning by the design know-how/plan presenting unit 16. The operator changes the gradient of the straight line and the mean value of brightness using the expression instructing unit 11 constituted by the pointing device such as a mouse and/or a keyboard. When such changes have been made, the system immediately recomputes the closely associated visual languages. The recomputed results are displayed by the analysis result presenting unit 6, and the changed image is displayed by the expressed image displaying unit 10. The operator gives further instructions to the brightness distribution changing unit 10-3 to change the gradient while verifying the displayed information and the modified image on the expressed image displaying unit 10. The operator may continue this process until he or she is satisfied with the result.

With the third embodiment, as described, changes in the distribution of brightness are effected linearly in space. Alternatively, it is possible directly to modify the histogram by which the vertical brightness of quadratic curves and pixels has been totaled.

Unlike the first embodiment, the third embodiment does not control the way visual languages are perceived to apply to sensitive languages. Instead, the third embodiment permits control of the discrepancies between the current values of visual languages (which are fewer than sensitive languages) on the one hand, and their target values on the other hand. The operator thus finds it easier to grasp mutually influential visual feature quantities and to add appropriate and complicated expressions to the image as a result. The fact that visual languages understood by designers are interposed between visual feature quantities and sensitive languages for translation from the former to the latter makes two things possible. First, design know-how is classified into two categories, know-how of high generality and that of low generality. Second, the components of design know-how are suitably organized before they are accommodated into the system.

[Fourth Embodiment]

Figure 4:
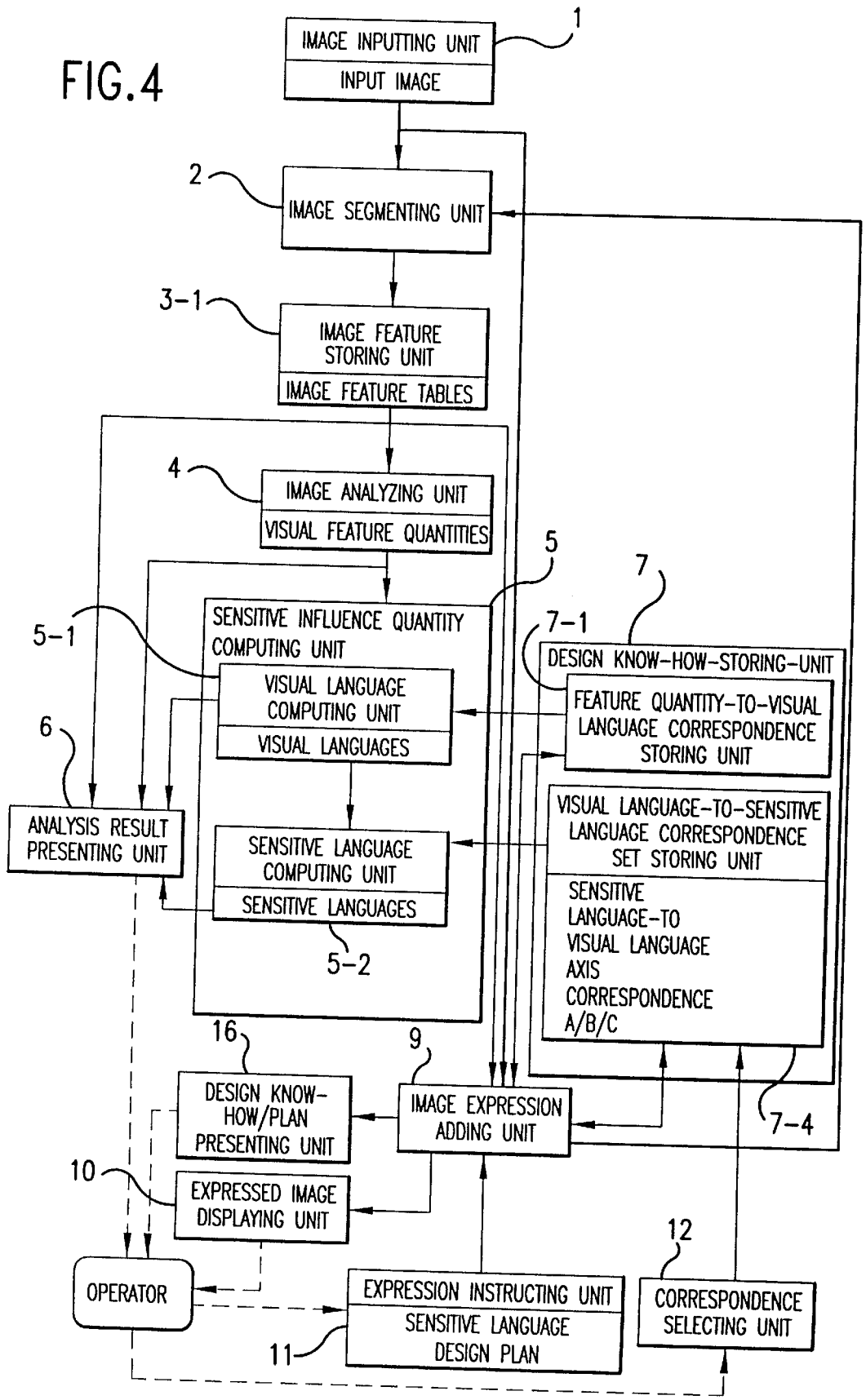
FIG. 4 is a block diagram of a fourth embodiment of the invention having a plurality of sensitive language-to-visual language axis correspondences.

The fourth embodiment of the invention will now be described with reference to FIG. 4. In FIG. 4, those parts with their counterparts already shown in FIGS. 1, 2 or 3 are given the same reference numerals, and detailed descriptions of the parts are omitted where they are repetitive. In FIG. 4, a visual language-to-sensitive language correspondence set storing unit 7-4 stores the correspondence between a plurality of sensitive languages on the one hand, and each of visual language axes on the other hand. The correspondence selected by a correspondence selecting unit 12 is supplied to the sensitive language computing unit 5-2 as well as to the image expression adding unit 9.

The third embodiment, as described, classifies design-know-how into feature quantity-to-visual language correspondences of high generality, and visual language-to-sensitive language correspondences that often vary depending on the ethnic and age group of viewers. Therefore, one disadvantage of the third embodiment is that because there exists only one correspondence between each visual language axis and sensitive languages, the correspondences need to be changed every time a different group of viewers is targeted. This disadvantage is circumvented by the fourth embodiment wherein a plurality of sets of frequently used correspondences are stored in the visual language-to-sensitive language correspondence set storing unit 7-4, as shown in FIG. 4. For a given group of viewers, the necessary set of correspondences is selected by the correspondence selecting unit 12.

[Fifth Embodiment]

Figure 5:
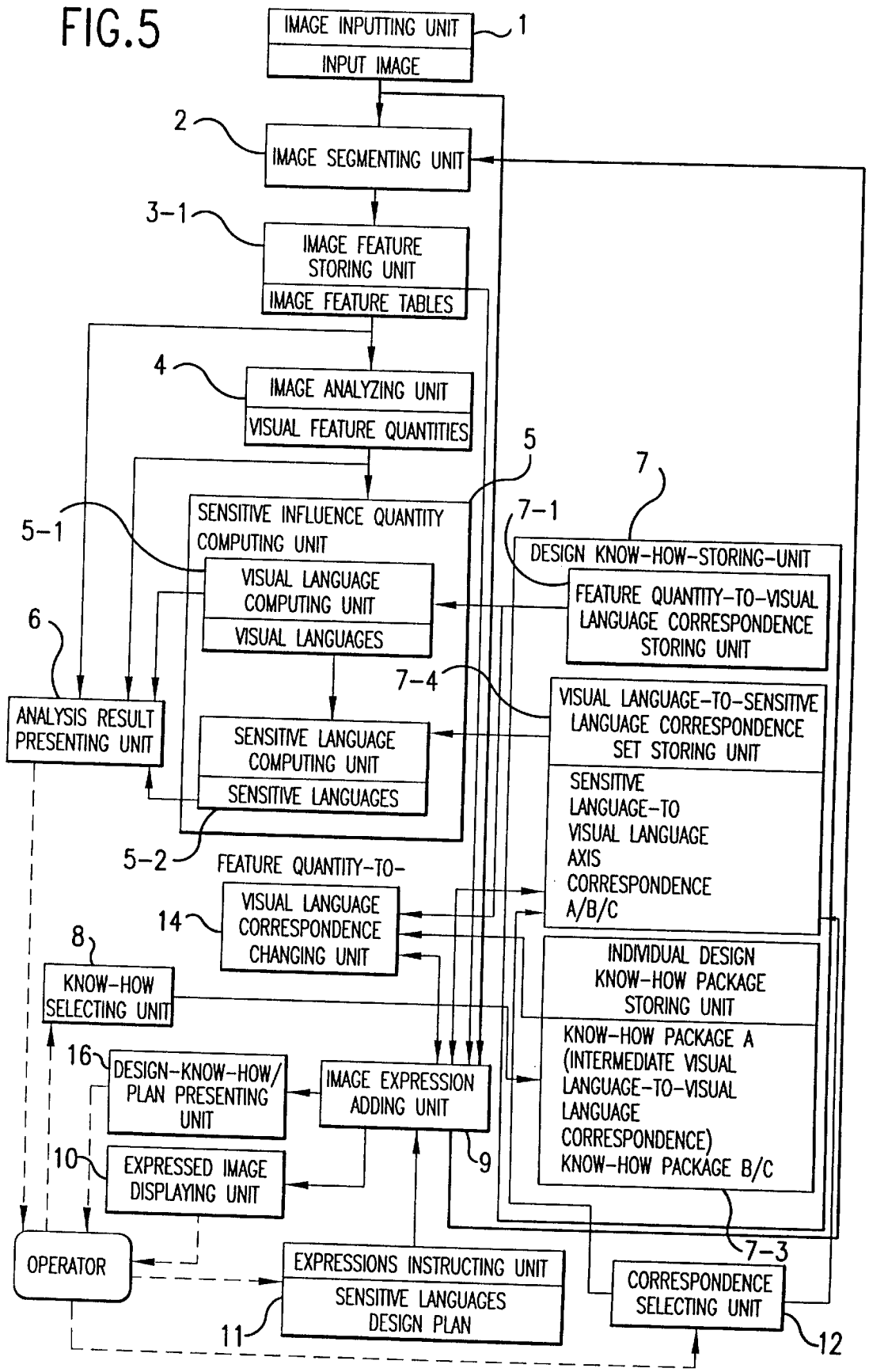
FIG. 5 is a block diagram of a fifth embodiment of the invention having a plurality of know-how packages to choose from for adding expressions to an image.

The fifth embodiment of the invention will now be described with reference to FIG. 5. In FIG. 5, those parts with their counterparts already shown in FIGS. 1, 2, 3 or 4 are given the same reference numerals, and detailed descriptions of the parts are omitted where they are repetitive. In FIG. 5, an individual design know-how package storing unit 7-3 stores a plurality of packages of know-how (i.e., visual feature quantity-to-visual language correspondences). On the basis of the know-how selected by a know-how selecting unit 8, a feature quantity-to-visual language correspondence changing unit 14 changes the information in the feature quantity-to-visual language correspondence storing unit 7-1. The visual language-to-sensitive language correspondence set storing unit 7-4 outputs a visual language. Visual feature quantities corresponding to the output visual language are returned to the image expression adding unit 9 in accordance with the feature quantity-to-visual language correspondence changed above.

As discussed in connection with the third embodiment, the feature quantity-to-visual language correspondence storing unit 7-1 stores feature quantity-to-visual language correspondences in such a manner that an analyzing process produces a plurality of visual feature quantities corresponding to the same visual language. For example, consider the visual language "motion." As described, motion in the image is expressed by the following formula:

$$\text{Motion} = ka3 \times F \{(|\text{heaviness of image part } I1 - \text{heaviness of image part } I4| + |\text{heaviness of image part } I2 - \text{heaviness of image part } I3|)/\text{heaviness of the entire image}, kb3\} \times 100 + ka4 \times F\{(\text{number of areas having the same direction component as the direction of texture for maximum population} \times \text{mean strength of texture for such area})/(\text{number of all areas} \times 255), kb4\} \times 100\%,$$

where motion is equated to 100% if the computed results exceed 100. Thus greater motion is provided in the image in one of two ways: either by raising the number of areas having the same direction component as the direction of texture for maximum population; or by increasing the difference in heaviness between the image parts I1 and I4, or between the image parts I2 and I3.

Since it is not known what sort of image is to be input next for analysis, the system needs to be prepared to evaluate the input image using all intermediate languages. When an expression is added to the image, the resulting image varies considerably depending on what kinds of visual feature quantities are used in expressing visual languages. That is, where expressions are to be added to the image, the kinds of visual feature quantities used matter significantly in terms of aesthetic value. To create an image giving the impression of unity requires selecting an appropriate visual language-to-visual feature quantity correspondence. Thus the fifth embodiment incorporates a plurality of packages of diverse design know-how to choose from, as shown in FIG. 5. These design know-how packages are stored in the individual design know-how package storing unit 7-3, and any one of the stored packages is selected by the know-how selecting unit 8. Illustratively, a know-how package A is furnished as follows:

$$\text{Motion} = F\{(|\text{heaviness of image part } I1 - \text{heaviness of image part } I4| + |\text{heaviness of image part } I2 - \text{heaviness of image part } I3|)/\text{heaviness of the entire image}, 0.4\} \times 100\%.$$

A know-how package B is given illustratively as follows:

$$\text{Motion} = 0.5 \cdot F \{(|\text{heaviness of image part } I1 - \text{heaviness of image part } I4| + |\text{heaviness of image part } I2 - \text{heaviness of image part } I3|)/\text{heaviness of the entire image}, 0.5\} + 100 + 1.5 \cdot F\{(\text{number of areas having the same direction component as the direction of texture for maximum population} \times \text{mean strength of texture for such areas})/(\text{number of all areas} \times 255), 0.3\} \times 100\%,$$

where motion = 100% if the computed results exceed 100.

The feature quantity-to-visual language correspondence changing unit 14 determines which of the visual feature quantities to select in correspondence with the visual languages stored in the feature quantity-to-visual language correspondence storing unit 7-1. The selection is made in accordance with the information from the individual design know-how package storing unit 7-3. The visual feature quantities thus selected are sent to the image expression adding unit 9.

[Sixth Embodiment]

Figure 6:
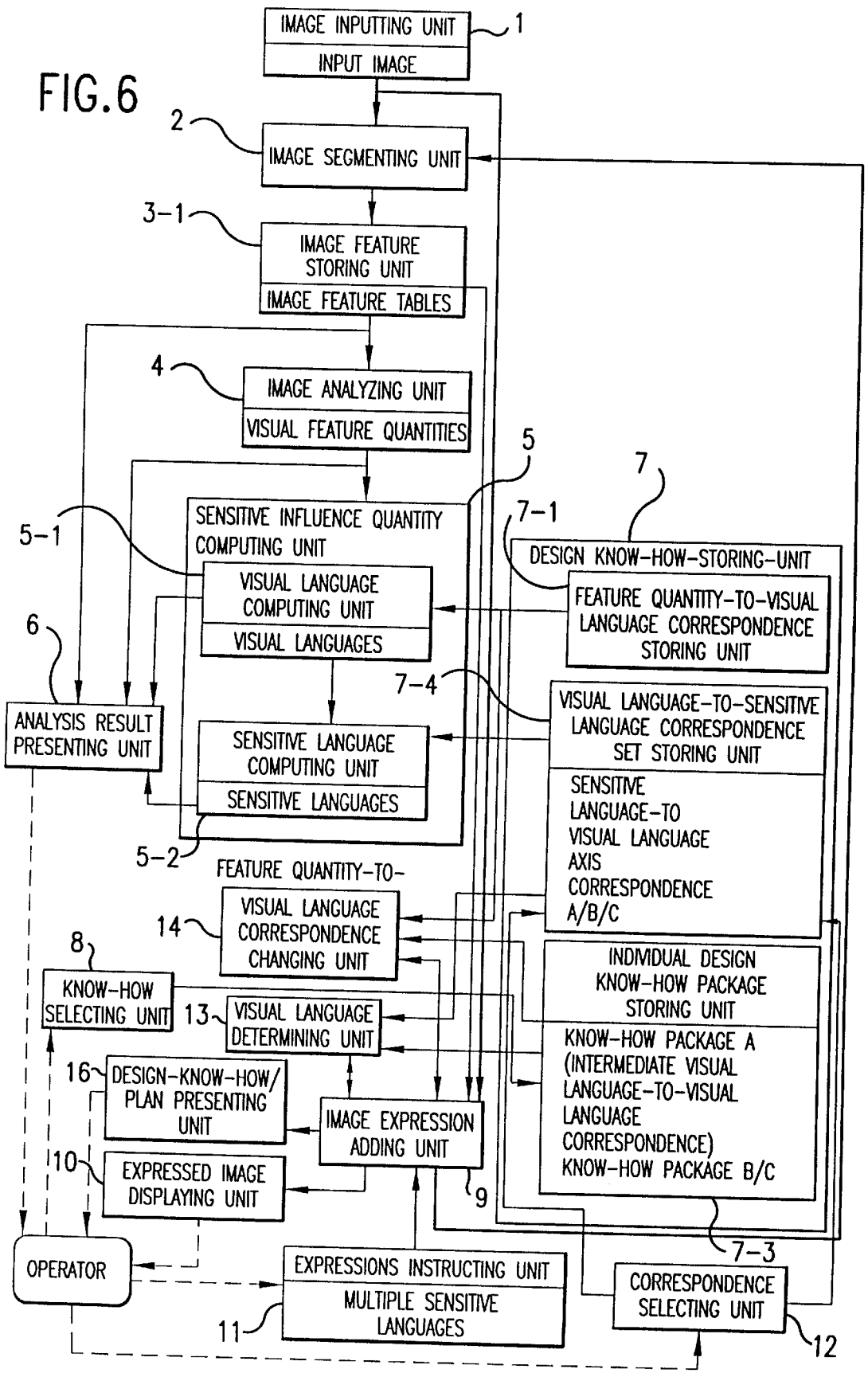
FIG. 6 is a block diagram of a sixth embodiment of the invention with the ability to add expressions to the target image when the operator simply inputs a plurality of sensitive languages instead of a design plan.

The sixth embodiment of the invention will now be described with reference to FIG. 6. In FIG. 6, those parts with their counterparts already shown in any of FIGS. 1 through 5 are given the same reference numerals, and detailed descriptions of the parts are omitted where they are repetitive. In FIG. 6, a visual language determining unit 13 acquires via the image expression adding unit 9 a plurality of sensitive languages instructed by the expression instructing unit 11 as well as the image feature table information from the image feature storing unit 3-1. The visual language determining unit 13 creates a design plan based on the sensitive languages and information thus acquired and using information from the individual design know-how package storing unit 7-3 storing a plurality of know-how packages (i.e., visual feature quantity-to-visual language correspondences, know-how packages for creating design plans). Suitable visual languages are eventually determined on the basis of the design plan and with reference to the sensitive language-to-visual language axis correspondence selected by the correspondence selecting unit 12 from the visual language-to-sensitive language correspondence set storing unit 7-4.

The first through the fifth embodiments, as described, require the operator to input sensitive languages and a design plan via the expression instructing unit 11. The sixth embodiment of FIG. 6, by contrast, comprises the visual language determining unit 13 for determining visual languages using necessary know-how retrieved from the individual design know-how package storing unit 7-3, so that an appropriate design plan is automatically generated when a combination of sensitive languages is supplied. The necessary know-how refers to an appropriate set of visual languages which is output in correspondence to the supplied set of sensitive languages.

The simplest way to determine visual languages is to select them in order of their priorities. In the example of FIG. 31, the sensitive languages "gentle," "sporty" and "safe" are respectively assigned the visual language priorities of 2:1:1. Thus the two visual languages "vivid" and "warm" most closely associated with the sensitive language "gentle" are determined for that sensitive language. For the sensitive language "sporty," the visual language "motion-rhythmical" most closely associated therewith is determined. Likewise for the sensitive language "safe," the visual language "unstable" most closely associated therewith is determined. If any visual language encountered during the determining process has already been selected, the next most closely associated visual language is selected instead. Although this method is the simplest way of automatically determining visual languages, the process should preferably be modified by introducing designers' know-how in order to reflect diverse aesthetic senses. Because different designers have different know-how, each package of know-how is to be prepared by one designer.

[Seventh Embodiment]

Figure 7:
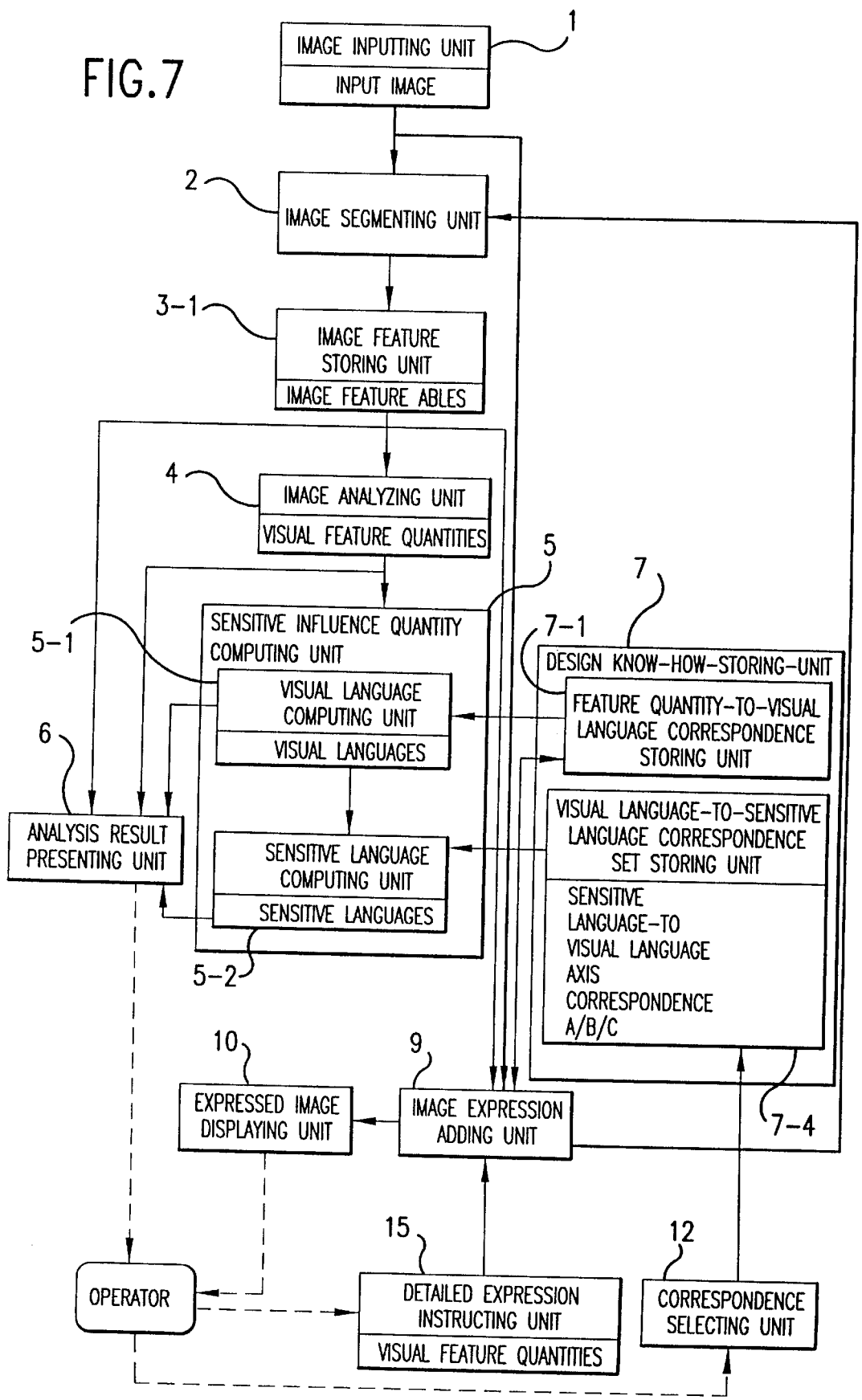
FIG. 7 is a block diagram of a seventh embodiment of the invention with the ability to let the operator add expressions directly to the target image using visual feature quantities.

The seventh embodiment of the invention will now be described with reference to FIG. 7. In FIG. 7, those parts with their counterparts already shown in any of FIGS. 1 through 6 are given the same reference numerals, and detailed descriptions of the parts are omitted where they are repetitive. In FIG. 7, the feature quantity-to-visual language correspondence storing unit 7-1 and the visual language-to-sensitive language correspondence set storing unit 7-4 transfer information to the sensitive influence quantity computing unit 5 alone and not to the image expression adding unit 9. The image expression adding unit 9 receives visual feature quantities directly from the operator via a detailed expression instructing unit 15, and adds expressions to the input image accordingly.

The first through the sixth embodiments, as described, are each a system to be used by operators with little knowledge of design. The seventh embodiment is a system to be handled by an operator with design knowledge. With this system, the knowledgeable operator finds it more convenient to use the detailed expression instructing unit 15 for directly instructing visual feature quantities, in place of the expression instructing unit 11 for designating a combination of sensitive languages.

[Eighth Embodiment]

Figure 8:
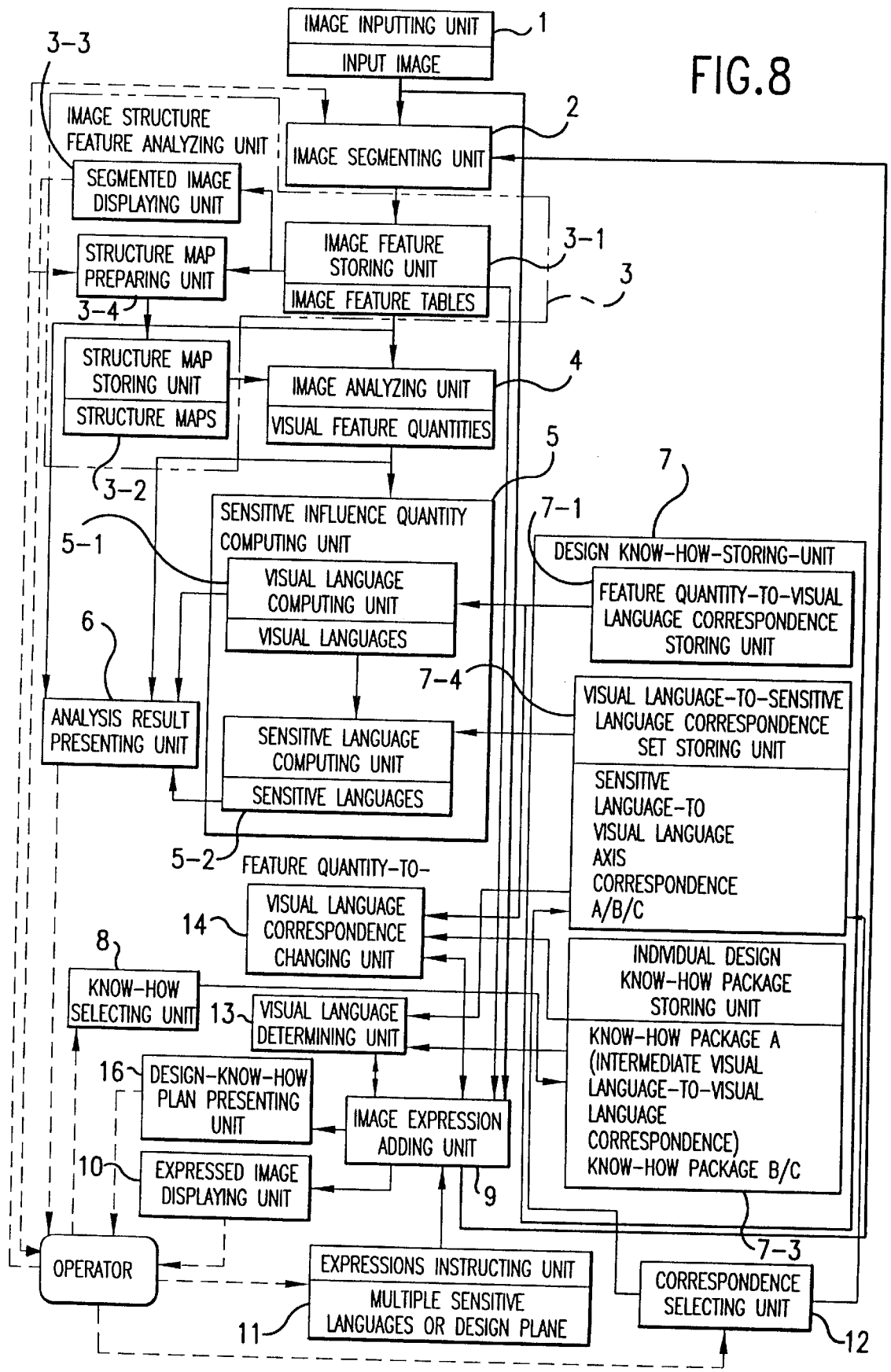
FIG. 8 is a block diagram of an eighth embodiment of the invention supplemented by an image structure/feature analyzing unit 3 to provide structures to the input image.

The eighth embodiment of the invention will now be described with reference to FIG. 8. In FIG. 8, those parts with their counterparts already shown in any of FIGS. 1 through 7 are given the same reference numerals, and detailed descriptions of the parts are omitted where they are repetitive. In FIG. 8, the result of segmentation by the image segmenting unit 2 is written to an image feature table in the image feature storing unit 3-1 and displayed by a segmented image displaying unit 3-3 at the same time. Watching the displayed result, the operator combines segmented areas into parent areas so that desired expressions may be easily added thereto. The areas supplemented with the additional expressions are arranged into a structure map to be stored in the structure map storing unit 3-2. The image analyzing unit 4 computes visual feature quantities based on the structure map thus obtained and on the image feature table in the image feature storing unit 3-1.

The first through the seventh embodiments, as described, add modifications to the image as a whole. The eighth embodiment offers the operator means to add expressions to an image in a more assertive manner while the image is being edited. Where an image is to be edited, the image segmented by the image segmenting unit 2 should preferably be given structures that will make the editing process easier. For that purpose, the image feature storing unit 3-1 is made part of the image structure/feature analyzing unit 3, the latter further including a structure map preparing unit 3-4 for structuring the input image.

Figure 34:
FIG. 34 is a view showing the result of segmenting an image illustratively into a large number of areas.
Figure 35:
FIG. 35 is a view depicting the result of segmenting an image illustratively into a small number of areas.
Figure 36:
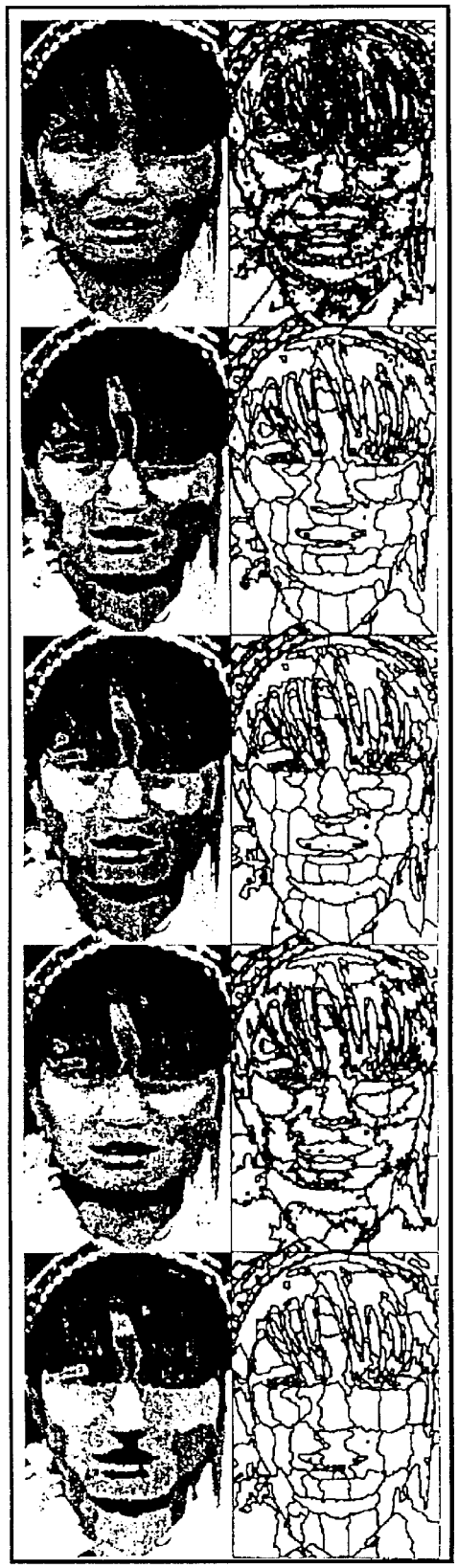
FIG. 36 is a view indicating the result of varying emphasized proportions of color and position information in an image.
Figure 37:
FIG. 37 is a view portraying the result of segmenting only the background in an arbitrary manner.

When segmenting the input image into structures, the image segmenting unit 2 of the eighth embodiment needs to be supplied with more detailed instructions than its counterpart of the preceding embodiments. This requires arranging the image segmenting unit 2 so that it can admit instructions from the operator. For image segmentation, the image segmenting unit 2 uses what is known as the division k-means algorithm. The information supplied to the image segmenting unit 2 includes the resolution of segmentation, emphasized image information (hue, brightness, texture, etc.), the choice of whether or not to perform adaptive processing on the image, and the presence of any arbitrary deformation in segmented areas. FIGS. 34 through 37 show a number of segmentation examples. FIG. 34 shows an example in which the image is segmented into a small number of areas. FIG. 35 depicts an example in which the image is segmented into a large number of areas. FIG. 36 is an example in which the information on colors and that on positions are changed in proportions of emphasis. FIG. 37 is an example where arbitrary area deformation is applied only to the image portion with a small amount of texture (i.e., background). The image segmented in the manner described is displayed by the segmented image displaying unit 3-3. Watching the displayed image, the operator touches up each of the image portions such as the face, hair, eyes, clothes and background, The results of the process are written to a table illustratively composed of the following:

structure 1→area 3, area 4, area 9, area 12, area 13, area 14;
structure 2→area 2, area 5, area 6, area 7, area 8, area 11, That table is called a structure map and is stored into the structure map storing unit 3-2. This information is utilized when the image is edited by use of the image expression adding unit 9.

Figure 38:
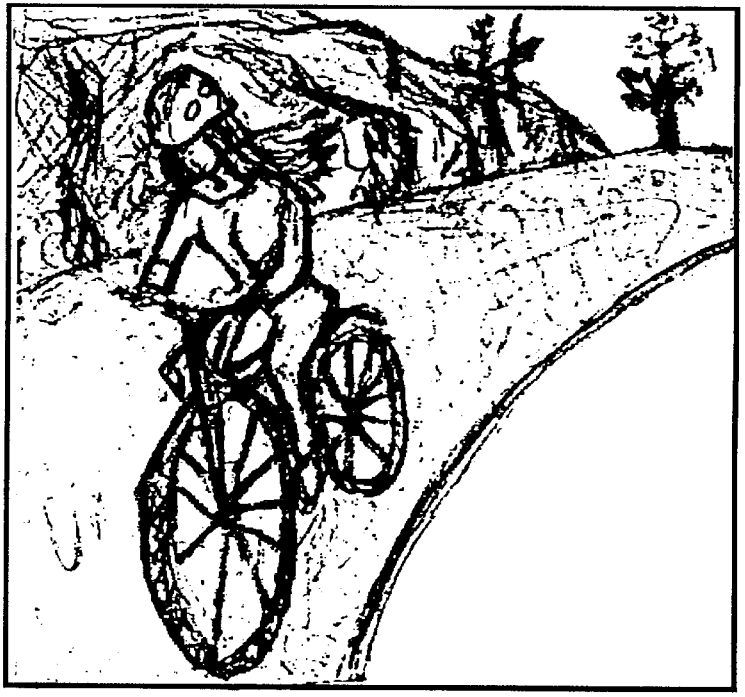
FIG. 38 is a view of an input image handled by the eighth embodiment.
Figure 39:
FIG. 39 is a view showing how the input image of FIG. 38 is typically structured.
Figure 40:
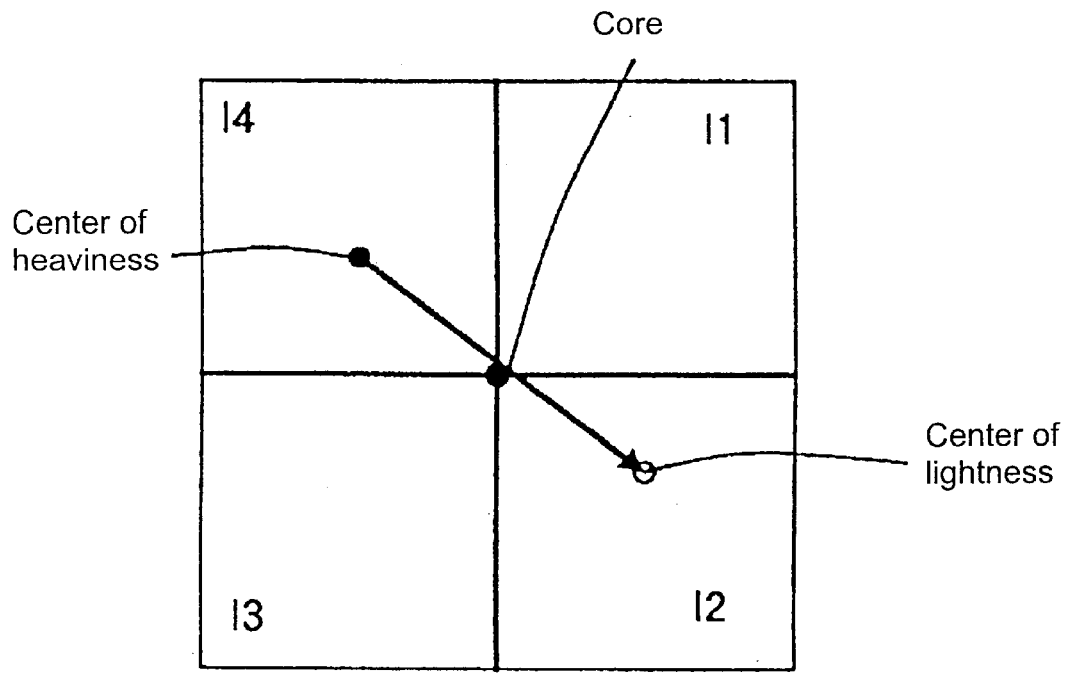
FIG. 40 is a view of a display of visual language for analyzing unstableness of the image.

The actual process of editing will now be described. To return again to the example of the bicycle retailer's sales campaign discussed in connection with the third embodiment, a photograph showing a woman riding on a bicycle (FIG. 38) is first input. The input image is then structured as shown in FIG. 39. Visual feature quantities are computed from the structured input image. Of the visual feature quantities thus computed, FIG. 40 shows the center of heaviness, the center of lightness, the vector from heaviness center to lightness center, the core of the image, and image areas I1, I2, I3 and I4 segmented around the core. Because the center of heaviness is elevated and because the vector is oriented downward, the visual language of unstableness takes a value of as high as 80. With the entire image on the dark side, the visual language of brightness is as low as 30. Although the clothes and the bicycle are colored pink, the image appears quiet and devoid of warmness due to the deep green rocks and the gray road surface. A contrast in heaviness between the areas I4 and I1 gives rise to a high level of asymmetry in the image, which leads to the impression of a large motion. A rhythmic analysis reveals a bright-dark rhythm emanating from the rocks. The results of the analysis above are displayed by the analysis result displaying unit, as shown in FIG. 30. The operator prepares a design plan based on the displayed results and inputs the design plan to the system. In turn,. the system causes the design know-how/plan presenting unit 16 to display discrepancies between the input target values of the plan and their corresponding current values (FIG. 32).

Figure 41:
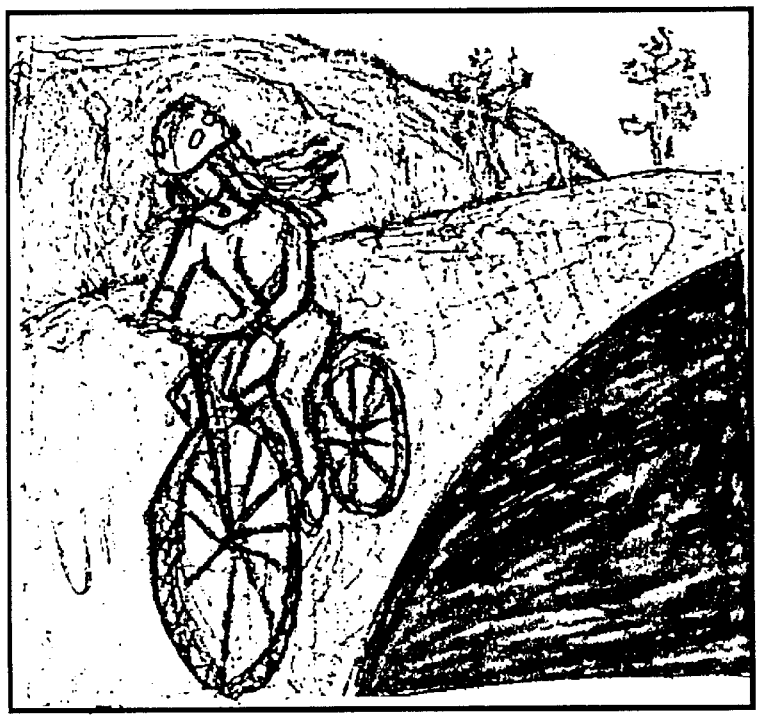
FIG. 41 is a view of an example in which the stableness of the image is improved and displayed accordingly.

The procedures up to this point with the eighth embodiment are approximately the same as with the third embodiment. The system provides the operator with means to change visual feature quantities in line with the design plan shown in FIGS. 32 and 33. In the earlier description, such visual feature quantity changing means was implemented in the form of the trimming guide 10-1 and slide type number input device 10-2 for the first embodiment, and in the form of the brightness distribution changing unit 10-3 for the third embodiment. By contrast, the eighth embodiment allows the operator to edit the image in a more assertive manner changing visual feature quantities in more detail. Because the impressions of unstableness and motion vary significantly depending on composition, the system asks the operator via the design know-how/plan presenting unit 16 whether or not trimming is desired. Since the operator likes the composition of the input image, he or she tells the system via the expression instructing unit 11 not to perform trimming. In response, the system requests the operator to change partially the heaviness of the image. At the same time, the system warns the operator that changes in image heaviness can entail corresponding changes in the visual languages of brightness and motion. In the example above, it is necessary to change the heaviness of image parts so that the vector from heaviness center to lightness center will be oriented upward and that the center of heaviness will be lowered as much as possible. In addition, it is preferable to leave intact the impression of motion created by the difference in heaviness between the image parts I4 an I1. The operator designates the structure 1 to the system via the expression instructing unit 11, and instructs the system to change the heaviness of that structure. The system confirms the selection of the structure 1 by causing the corresponding part in the expressed image displaying unit 10 to flash. Concurrently, the system displays within the expressed image displaying unit 10 the slide type number input device 10-2 whereby the operator may change the heaviness of the part in question. The operator then changes the heaviness by manipulating the slide type number input device 10-2 on display. This causes the visual languages shown in FIGS. 32 and 33 to vary in real time, so that the operator can continue the process while matching the current results. In the same manner, the operator goes on to change the heaviness of the structures 2 and 3. FIG. 41 shows the resulting image modified in the manner described wherein the impression of stableness is enhanced while that of motion is left intact. FIG. 42 indicates the visual languages in effect when the image of FIG. 41 is established. The operator checks the screen of FIG. 42 and, ascertaining that the impression of unstableness is ameliorated considerably, terminates the process.

The system then passes control to the processing of the next sensitive language "sporty." Since rhythmicity has been judged to be appropriate, the visual language "motion" needs to be changed. As described, motion in the image is expressed by the following formula:

Motion = $ka3 \times F$ {(|heaviness of image part $I1$ − heaviness of image part $I4$| + |heaviness of image part $I2$ − heaviness of image part $I$|)/heaviness of the entire image, $kb3$} × 100 + $ka4 \times F$ {(number of areas having the same direction component as the direction of texture for maximum population × mean strength of texture for such areas)/(number of all areas × 255), $kb4$} × 100%.

The processing on the first term has already been made. The system thus decides to process the second term, and requests the operator to select the way in which to add texture to the image. The eighth embodiment illustratively offers the following options:

1. Add motion-oriented texture to the entire image.
2. Add motion-oriented texture to an object in motion.
3. Add motion-oriented texture to the background, as in panning.

It is assumed here that the operator has selected the option 3. In response, the system again asks the operator to specify which structures are to be the object and which structures are to be the background. The operator designates the necessary structures via the expression instructing unit 11. With the eighth embodiment, the structures 6, 10, 7, 12, 8, 11 and 14 constitute the object and the remaining structures make up the background.

Figure 43:
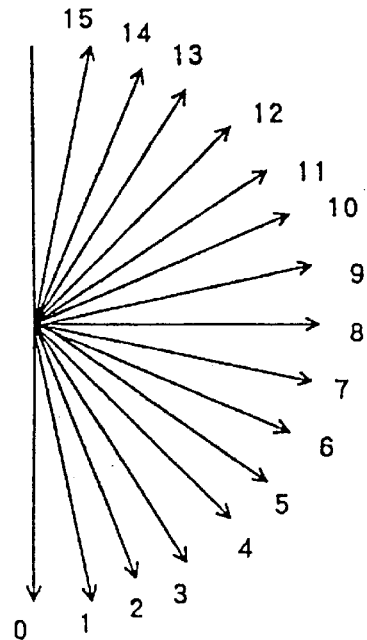
FIG. 43 is a view showing typically numbered directions of texture.
Figure 44:
FIG. 44 is a view of an image supplemented by a movement.
Figure 45:
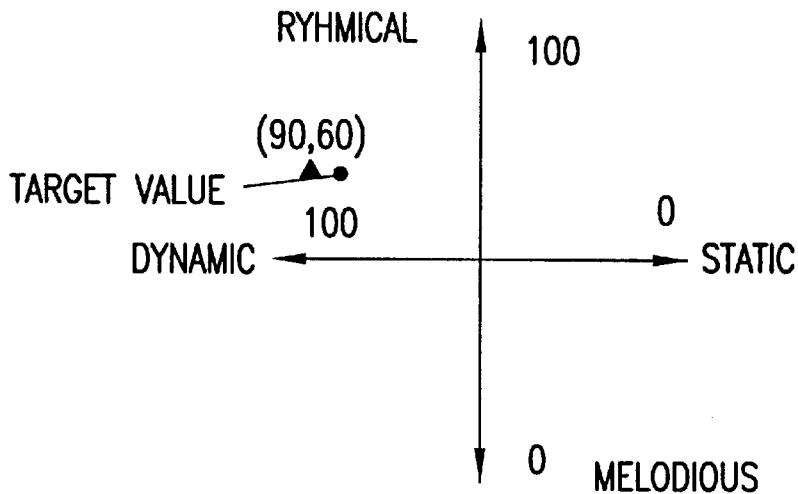
FIG. 45 is a view of the result of image analysis indicating the addition of the movement to the image.

The system then requests the input of the direction and strength of motion. In response, the operator specifies the direction of motion using numbers shown in FIG. 43, and designates the strength of motion using a desired number of pixels in which to shift structures. Given the specified values, the system performs the process of shifting only the background of the image by one pixel and adding the shifted background to the image, the process being repeated as many times as the designated number of pixels. At the end of the repeated process, the system finds an average of the added results by dividing them by the number of the pixels involved. The averaged result is shown in FIG. 44, and the visual language in effect in this case is indicated in FIG. 45. If the operator is satisfied with the value of the visual language in FIG. 45, the system then proceeds to change the visual language "vivid-warm."

Below is a description of what is known as contrast between visual languages. This contrast is made analyzable after the image has been structured. The contrast in this context is a difference in property between a plurality of structures. Appropriately selecting such differences makes it possible to highlight a certain structure or only a certain property of a given structure. Among commonly used effects is the effect of contrast between the background and the object in question. Effectively using the effect of contrast gives a tremendous boost to the visual effects in general. FIG. 14 lists visual feature quantities which are associated with contrast or which are made analyzable when the image has been structured. The eighth embodiment utilizes the effect of contrast regarding the visual language "vivid-warm" that is selected to express the sensitive language "gentle."

To return to the processing above, the operator had the bicycle and the female rider's clothes colored pink in the photograph with a view to expressing the sense of "gentleness." But the background in green and gray caused the overall impression of the image to deviate from "gentleness." With the effect of contrast taken into consideration, however, the background may be perceived to highlight the colors of the bicycle and the woman's clothes, thereby stressing the sense of "gentleness." When the system initiates the process of modifying the visual language "vivid-warm," the operator thus instructs the system via the expression instructing unit 11 to compute the effect of contrast regarding the visual language "vivid-warm." The system responds in the manner described, i.e., by asking the operator what to do with the object in question and its background. The operator in turn designates the female rider and the bicycle as the object, also in the manner described above. On the basis of the information thus furnished, the system computes the effect of contrast between the background and the object in terms of the visual language "vivid-warm" using the following formula:

Effect of contrast=f{distance in <vivid-warm> space between background and object, k13}×100%.

Figure 46:
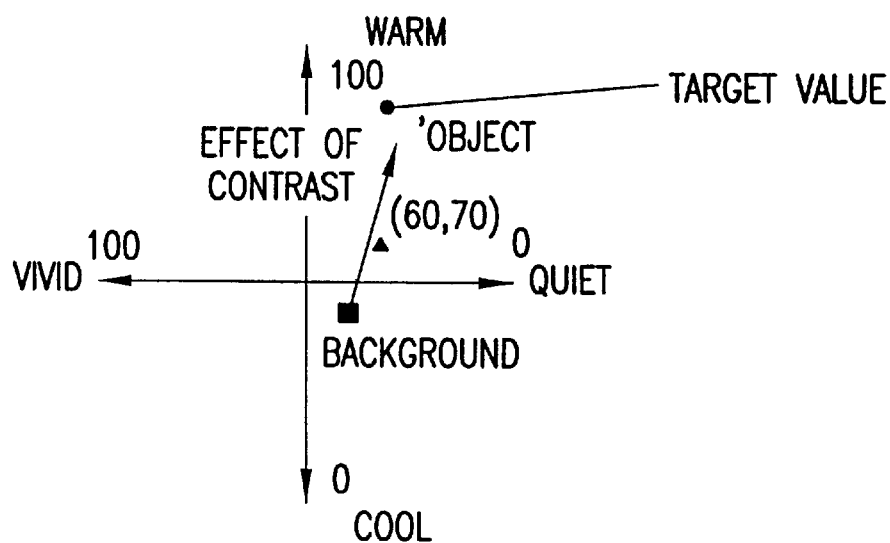
FIG. 46 is a view of an example in which contrasting effects are sufficiently represented.

FIG. 46 shows typical visual languages expressed by the background and the object. In this example, a sufficiently high effect of contrast is seen to be obtained for the woman and the bicycle emanating "gentleness." If the effect of contrast is deemed insufficient, the operator instructs the system to increase the difference in visual language between the background and the object with reference to the result of the analysis acquired so far. When satisfied with the result returned by the system, the operator terminates all processing.

[Ninth Embodiment]

Figure 9:
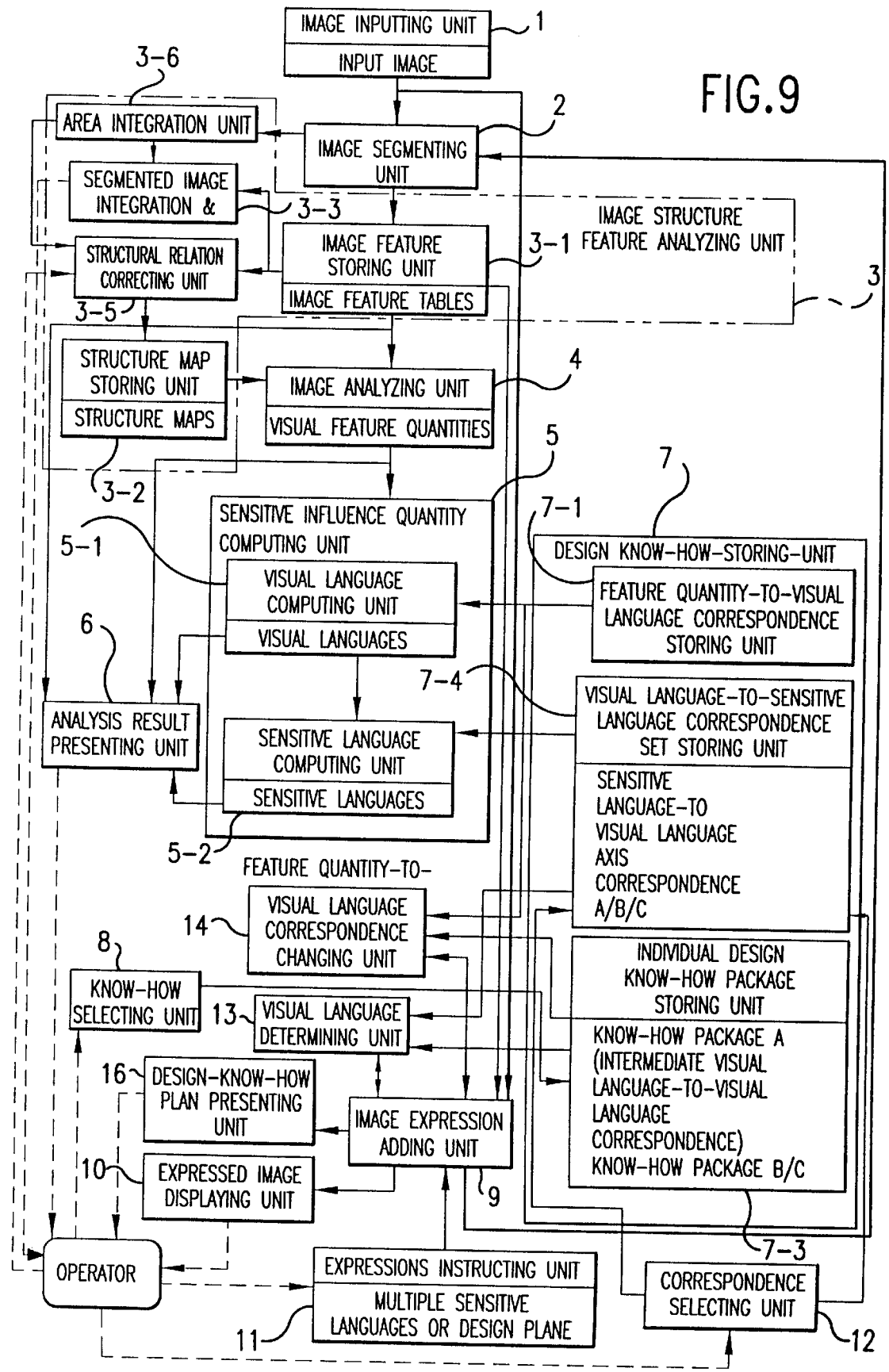
FIG. 9 is a block diagram of a ninth embodiment of the invention with its image structure/feature analyzing unit 3 capable of creating structures in a limitedly automatic manner.

The ninth embodiment of the invention will now be described with reference to FIG. 9. In FIG. 9, those parts with their counterparts already shown in any of FIGS. 1 through 8 are given the same reference numerals, and detailed descriptions of the parts are omitted where they are repetitive. In FIG. 9, the result segmented by the image segmenting unit 2 is written to an image feature table in the image feature storing unit 3-1, and the segmented areas are combined into parent areas. The resulting areas are displayed by the segmented image displaying unit 3-3. Watching the displayed results, the operator modifies inappropriately combined areas through a structural relation correcting unit 3-5. The results, supplemented by additional information, are made into a structure map to be stored into the structure map storing unit 3-2. The image analyzing unit 4 computes visual feature quantities based on the structure map thus acquired and on the image feature table in the image feature storing unit 3-1.

With the eighth embodiment, as described, the operator inputs image structures for all areas. By contrast, the ninth embodiment has an area integrating unit 3-6 for automatically creating image structures which are then corrected by the operator using the structural relation correcting unit 3-5. Illustratively, the area integrating unit 3-6 computes the distance between the centers of segmented areas, lists for each segmented area the N segmented areas having the shortest center-to-center distances up to the area in question, finds the degree of similarity between each segmented area on the one hand and the listed segmented areas corresponding thereto on the other hand, and integrates segmented areas of high similarity into one area. More details of the area integrating unit 3-6 are discussed illustratively in Japanese Patent Application No. Hei 6-96328 (1994).

[Tenth Embodiment]

Figure 15:
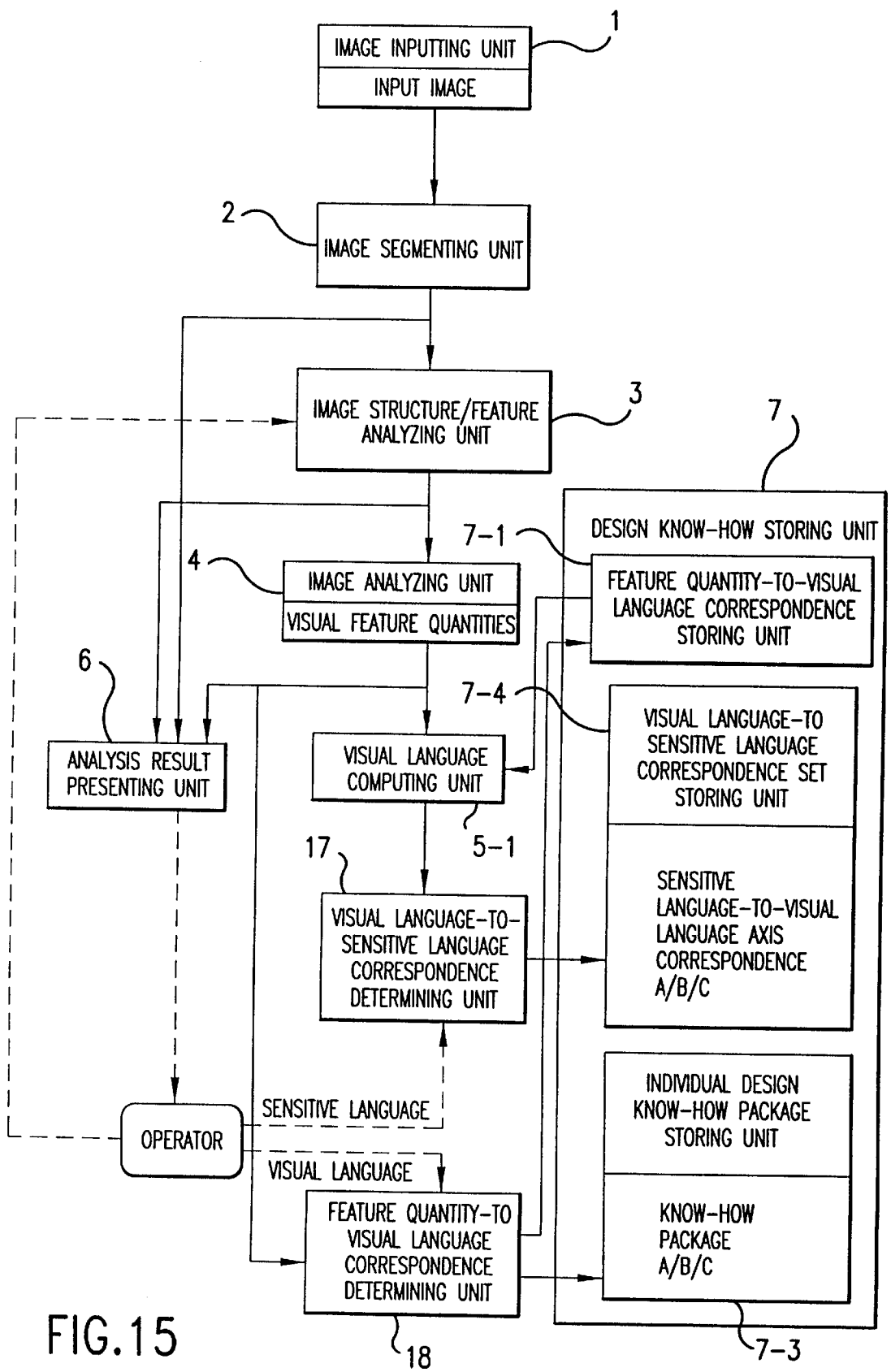
FIG. 15 is a block diagram of a tenth embodiment of the invention constituting a system that establishes design know-how.
Figure 16:
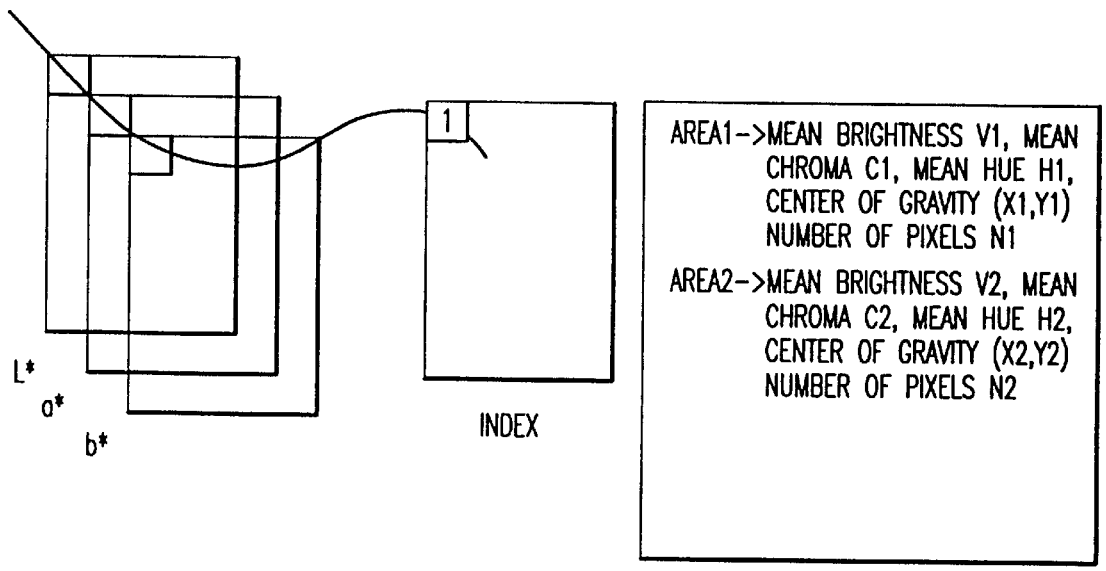
FIG. 16 is a view of an image feature table together with indices added to the input image.

A system for establishing design know-how for use with each of the above-described embodiments will now be described with reference to FIG. 15. The design know-how establishing system is implemented by supplementing any one of the above embodiments with desired functions. Where an individual design know-how package is to be acquired, a large number of a specific designer's works are first collected. Of these works collected, those closely associated with a given visual language axis are selected and are made to correspond with numbers on the visual language axis in question. The works with their correspondence to the visual language axis established are input through the image inputting unit 1 and segmented by the image segmenting unit 2. The segmented results are displayed by the analysis result presenting unit 6. Watching the displayed results, the operator gives instructions so that the image structure/feature analyzing unit 3 puts the image into structures. The image analyzing unit 4 translates the result of the structuring into visual feature quantities. These quantities are passed on to a feature quantity-to-visual language correspondence determining unit 18 together with the numbers predetermined by the designer on the visual language axis. The above process is carried out on the images in which the numbers on the number axis in question have been predetermined by the designer. At the end of the process, the designer's works closely associated with another visual language axis are selected and subjected to the same process. When the processing has been completed on all visual language axes involved, the visual feature quantity-to-visual language correspondence is determined and stored into the individual design know-how package storing unit 7-3.

When feature quantity-to-visual language correspondences are to be prepared for storage into the feature quantity-to-visual language correspondence storing unit 7-1, a sufficiently large number of works should preferably be selected and processed in the manner described so that the packaged design know-how will not be biased toward specific designers' propensities. This provides feature quantity-to-visual language correspondences of high generality which may be stored in the feature quantity-to-visual language correspondence storing unit 7-1.

A correspondence between sensitive languages stored in the visual language-to-sensitive language correspondence set storing unit 7-4 on the one hand, and each visual language axis on the other hand are obtained as follows: a large number of images are first input through the image inputting unit 1 so that the genres of images and designer-specific preferences are evenly distributed as much as possible. The input images are processed by the image segmenting unit 2, by the image structure/feature analyzing unit 3 and by the image analyzing unit 4. Thereafter, the visual language computing unit 5-1 computes visual languages using visual quantity-to-visual language correspondences stored in the feature quantity-to-visual language correspondence storing unit 7-1. The visual languages thus computed are clustered into similar images by a visual language-to-sensitive language correspondence determining unit 17. The clustered images are collaged, and the collaged images are assigned appropriate sensitive languages invoked by representative viewers of a given ethnic and/or age group through observation of the images. The visual language-to-sensitive language correspondence thus determined is stored into the visual language-to-sensitive language correspondence set storing unit 7-4. A plurality of visual language-to-sensitive language correspondences may be obtained when the process above is performed in collaboration with representative views of different ethnic and age groups.

As described, the invention when embodied allows the result of the analysis of an image to be reflected directly in the process of furnishing additional expressions to that image. This allows the operator with little knowledge of design to add appropriate expressions to the image in question. Whereas existing image analyzing systems based on conventional image scales are incapable of fully analyzing images expressed in sensitive languages that are contradictory in meaning, the inventive system working on the image scale proposed herein allows contradicting sensitive languages to be expressed on different visual language axes, whereby flexible expressions are made available. Despite the fact that sensitive languages contradictory in meaning can be expressed, visual languages of higher generality than sensitive languages can still be used concurrently during analysis. In addition, diverse packages of design know-how derived from various designers are provided for selection by the operator wherever desired. Because design know-how is organized in terms of sensitive and visual languages as well as visual feature quantities, the system is equipped easily with designer-specific knowledge and expertise. Translating the input image into structures permits sophisticated image analysis and expression supplementation, including highlighting of the effect of contrast between image components.

As many apparently different embodiments of this invention may be made without departing from the spirit and scope thereof, it is to be understood that the invention is not limited to the specific embodiments thereof except as defined in the appended claims.

What is claimed is:

1. An image analyzing and expression adding apparatus comprising:

image inputting means for inputting an electronic image;

image segmenting means for segmenting the image input through said image inputting means into a plurality of areas;

area feature storing means for storing physical feature quantities about each of said plurality of areas;

image analyzing means for computing visual feature quantities of the input image on the basis of said physical feature quantities;

design know-how storing means for storing the design know-how regarding the correspondence between said visual feature quantities of said input image on the one hand, and sensitive language in which to express impressions of said input image on the other hand;

sensitive influence quantity computing means for computing, on the basis of the information stored in said design know-how storing means, those factors of said sensitive language which correspond to said visual feature quantities of said input image;

analysis result displaying means for displaying in said sensitive language the impression perceived by viewers from said input image;

expression instructing means for instructing expressions to be added to said input image by use of said sensitive language;

image expression adding means for modifying said input image on the basis of the instructed expressions and the information stored in said design know-how storing means; and expressed image displaying means for displaying the modified image.

2. An image analyzing and expression adding apparatus according to claim 1, wherein said image segmenting means comprising:

texture extracting means for extracting a texture from said input image;

area segmenting means for performing area segmentation based on the extracted texture and said input image;

line extracting means for extracting major segments from the result of said area segmentation; and vanishing point extracting means for extracting vanishing points based on the extracted major segments.

3. An image analyzing and expression adding apparatus according to claim 1, wherein said design know-how storing means comprises:

feature quantity-to-visual language correspondence storing means for storing the correspondence between said visual feature quantities of said input image and a visual language for expressing visual features constituting a relatively universal scale; and visual language-to-sensitive language correspondence storing means for storing the correspondence between said visual language and said sensitive language which is influenced significantly by age groups and ethnic origins of viewers; and wherein said sensitive influence quantity computing means comprises:

visual language computing means for computing, on the basis of the information stored in said feature quantity-to-visual language correspondence storing means, those factors of said visual language which correspond to said visual feature quantities of said input image; and sensitive language computing means for computing, on the basis of the information stored in said visual language-to-sensitive language correspondence storing means, those factors of said sensitive language which correspond to those factors of said visual language which are determined by said visual language computing means.

4. An image analyzing and expression adding means according to claim 3, wherein said visual language-to-sensitive language correspondence storing means includes:

visual language-to-sensitive language correspondence set storing means for storing a plurality of sensitive language-to-visual language correspondences; and correspondence selecting means for selecting any of said plurality of correspondences between said sensitive language and said visual language.

5. An image analyzing and expression adding apparatus according to claim 3, further comprising:

individual design know-how package storing means for storing a plurality of correspondences between said feature quantities and said visual language in accordance with a plurality of packages of know-how in a given design;

know-how selecting means for selecting any of said plurality of packages of know-how; and feature quantity-to-visual language correspondence changing means for changing the information stored in said feature quantity-to-visual language correspondence storing means by use of said plurality of feature quantity-to-visual language correspondences stored in said design know-how package storing means;

wherein said input image is modified through the use of the feature quantity-to-visual language correspondence applicable to the selected package of know-how.

6. An image analyzing and expression adding apparatus according to claim 1, further comprising:

segmented image displaying means for displaying the input image segmented by said image segmenting means;

structure map preparing means for preparing a structure map expressing in a map the structural relation between parent areas and child areas, said parent areas representing major structures instructed by an operator in the segmented input image, said child areas being those areas encompassed in said parent areas; and structure map storing means for storing said structure map;

wherein the visual feature quantities of said input image are computed from the physical feature quantities of the segmented areas in said input image with reference to said structural relation.

7. An image analyzing and expression adding apparatus comprising:

image inputting means for inputting an electronic image;

image segmenting means for segmenting the image input through said image inputting means into a plurality of areas;

area feature storing means for storing physical feature quantities about each of said plurality of areas;

image analyzing means for computing visual feature quantities of the input image on the basis of said physical feature quantities;

design know-how storing means for storing the design know-how regarding the correspondence between said visual feature quantities of said input image on the one hand, and sensitive language in which to express impressions of said input image on the other hand;

sensitive influence quantity computing means for computing, on the basis of the information stored in said design know-how storing means, those factors of said sensitive language which correspond to said visual feature quantities of said input image;

analysis result displaying means for displaying in said sensitive language the impression perceived by viewers from said input image;

expression instructing means for instructing expressions to be added to said input image by use of said sensitive language;

selecting means for selecting the target area to be modified from among said plurality of areas;

image expression adding means for modifying the image of said target area on the basis of the instructed expressions and the information stored in said design know-how storing means; and expressed image displaying means for displaying the modified image.

8. An image analyzing and expression adding apparatus according to claim 7, wherein said plurality of areas segmented by said image segmenting means are grouped into at least one parent area, and wherein said target area to be modified is selected in units of said parent area.

9. An image analyzing apparatus comprising:

image inputting means for inputting an electronic image;

physical feature quantity computing means for computing physical feature quantities of the image input through said image inputting means;

visual feature quantity computing means for computing visual feature quantities based on said physical feature quantities;

design know-how storing means for storing design know-how including a correspondence between sensitive language for expressing image impressions on the one hand, and a plurality of visual features predetermined for the input image on the other hand;

sensitive language determining means for determining, on the basis of the information stored in said design know-how storing means, the sensitive language belonging to the image input through said image inputting means;

displaying means for displaying said sensitive language determined by said sensitive language determining means; and image expression adding means for modifying said input image on the basis of input expressions of sensitive language and the information stored in the design know-how storing means.

10. An image analyzing apparatus comprising:

image inputting means for inputting an electronic image;

physical feature quantity computing means for computing physical feature quantities of the image input through said image inputting means;

visual feature quantity computing means for computing visual feature quantities based on said physical feature quantities;

design know-how storing means for storing design know-how including a correspondence between sensitive language for expressing image impressions on the one hand, and a plurality of visual features predetermined for the input image on the other hand, said know-how further including sensitive influence quantities of said sensitive language which correspond to said visual feature quantities of said input image;

sensitive influence quantity computing means for computing, on the basis of the information stored in said design know-how storing means, the sensitive influence quantities of said sensitive language belonging to the image input through said image inputting means;

displaying means for displaying the sensitive influence quantities of said sensitive language which are computed by said sensitive influence quantity computing means;

sensitive influence quantity adjust means that inputs user adjustments to the displayed sensitive influence quantities; and image adjust means that adjusts the image in accordance with the user adjustments.

11. An image analyzing apparatus comprising:

image inputting means for inputting an electronic image;

physical feature quantity computing means for computing physical feature quantities of the image input through said image inputting means;

visual feature quantity computing means for computing visual feature quantities based on said physical feature quantities;

design know-how storing means for storing design know-how including a correspondence between sensitive language for expressing image impressions on the one hand, and a plurality of visual features predetermined for the input image on the other hand, said know-how further including those sensitive influence quantities of said sensitive language which correspond to said visual feature quantities of said input image;

sensitive language computing means for determining, on the basis of the information stored in said design know-how storing means, the sensitive language belonging to the image input through said image inputting means;

displaying means for displaying sensitive influence quantities of the sensitive language determined by said sensitive language computing means;

instructing means for instructing expressions to be added to the display of said displaying means by use of said sensitive language;

sensitive influence quantity computing means for computing, on the basis of the information stored in said design know-how storing means, the sensitive influence quantities of the sensitive language added by said instructing means in accordance with the visual feature quantities corresponding to the sensitive language which belongs to said input image and which is added by said instructing means; and sensitive influence quantity displaying means for displaying the sensitive influence quantities computed by said sensitive influence quantity computing means.

12. An image analyzing apparatus comprising:

image inputting means for inputting an electronic image;

physical feature quantity computing means for computing physical feature quantities of the image input through said image inputting means;

visual feature quantity computing means for computing visual feature quantities based on said physical feature quantities;

design know-how storing means for storing design know-how including a correspondence between sensitive language for expressing image impressions on the one hand, and a plurality of visual features predetermined for the input image on the other hand, said know-how further including those sensitive influence quantities of said sensitive language which correspond to said visual feature quantities of said input image;

sensitive language computing means for determining, on the basis of the information stored in said design know-how storing means, the sensitive language belonging to the image input through said image inputting means;

displaying means for displaying sensitive influence quantities of the sensitive language determined by said sensitive language computing means;

instructing means for instructing expressions to be added to the display of said displaying means by use of said sensitive language;

visual feature adding means for selecting, on the basis of the information stored in said design know-how storing means, the quantities of the visual features corresponding to the sensitive language instructed by said instructing means;

sensitive influence quantity computing means for receiving the visual features selected by said visual feature adding means, the visual features of said input image and the information from said design know-how storing means, said sensitive influence quantity computing means further computing the sensitive influence quantities of the sensitive language added by said instructing means on the basis of what has thus been received; and sensitive influence quantity displaying means for displaying the sensitive influence quantities computed by said sensitive influence quantity computing means.

13. An image analyzing and expression adding apparatus according to claim 12, further comprising:

image expression adding means for receiving the visual features selected by said visual feature adding means, the visual features of said input image and the information from said design know-how storing means, said image expression adding means further modifying said input image on the basis of what has thus been received; and expressed image displaying means for displaying the modified image.

14. An image analyzing apparatus comprising:

image inputting means for inputting an electronic image;

physical feature quantity computing means for computing physical feature quantities of the image input through said image inputting means;

visual feature quantity computing means for computing visual feature quantities based on said physical feature quantities;

design know-how storing means for storing design know-how including a correspondence between sensitive language for expressing image impressions on the one hand, and a plurality of visual features predetermined for the input image on the other hand, said know-how further including those sensitive influence quantities of said sensitive language which correspond to said visual feature quantities of said input image;

sensitive language computing means for determining, on the basis of the information stored in said design know-how storing means, the sensitive language belonging to the image input through said image inputting means;

displaying means for displaying sensitive influence quantities of the sensitive language determined by said sensitive language computing means;

instructing means for instructing expressions to be added to the display of said displaying means by use of said sensitive language;

visual feature adding means for selecting, on the basis of the information stored in said design know-how storing means, the quantities of the visual features corresponding to the sensitive language instructed by said instructing means;

sensitive influence quantity computing means for receiving the visual features selected by said visual feature adding means, the visual features of said input image and the information from said design know-how storing means, said sensitive influence quantity computing means further computing the sensitive influence quantities of said sensitive language belonging to said input image and the sensitive influence quantities of the sensitive language added by said instructing means; and sensitive influence quantity displaying means for displaying the sensitive influence quantities computed by said sensitive influence quantity computing means.

15. An image analyzing and expression adding apparatus according to claim 14, further comprising:

image expression adding means for receiving the visual features selected by said visual feature adding means, the visual features of said input image and the information from said design know-how storing means, said image expression adding means further modifying said input image on the basis of what has thus been received; and expressed image displaying means for displaying the modified image.

* * * * *